(12) United States Patent
Sammon et al.

(10) Patent No.: US 8,597,115 B2
(45) Date of Patent: *Dec. 3, 2013

(54) SYSTEMS AND METHODS FOR PORTABLE WAGERING MEDIUMS

(71) Applicant: IGT, Reno, NV (US)

(72) Inventors: Russell P. Sammon, San Francisco, CA (US); Jeffrey Y. Hayashida, San Francisco, CA (US); Daniel E. Tedesco, Huntington, CT (US); Stephan C. Tulley, Monroe, CT (US); Gregory J. Scribner, Southbury, CT (US); Carson C. K. Fincham, Ridgefield, CT (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/747,010

(22) Filed: Jan. 22, 2013

(65) Prior Publication Data

US 2013/0190076 A1 Jul. 25, 2013

Related U.S. Application Data

(63) Continuation of application No. 12/067,694, filed as application No. PCT/US2007/079518 on Sep. 26, 2007, now Pat. No. 8,382,582.

(60) Provisional application No. 60/826,977, filed on Sep. 26, 2006.

(51) Int. Cl.
*G07F 7/00* (2006.01)
*A63F 13/00* (2006.01)

(52) U.S. Cl.
USPC .............. 463/25; 194/205; 194/214; 264/132

(58) Field of Classification Search
USPC ...................... 463/25; 194/205, 214; 264/132
See application file for complete search history.

(56) References Cited

U.S. PATENT DOCUMENTS

| 3,441,280 A | 4/1969 | Eggermont |
| 3,906,460 A | 9/1975 | Halpern |

(Continued)

FOREIGN PATENT DOCUMENTS

| EP | 0057602 | 8/1982 |
| WO | WO9603712 | 2/1996 |

(Continued)

OTHER PUBLICATIONS

U.S. Appl. No. 60/202,573, filed May 10, 2000, Jorasch et al.

(Continued)

*Primary Examiner* — William H McCulloch, Jr.
(74) *Attorney, Agent, or Firm* — Neal, Gerber & Eisenberg LLP

(57) ABSTRACT

Some embodiments are associated with wagering game devices and/or portable wagering mediums. Some portable wagering mediums are capable of outputting various indications related to one or more potential or current statuses of the portable wagering mediums. Some wagering game devices are operable to (i) determine a status of a portable wagering medium and (ii) cause, based on the determining, an outputting of an indication of the status via an output device coupled to the portable wagering medium. In some embodiments, a central server or other device conducts the determining of the status and/or the causing of the outputting. The status of a portable wagering medium may be based on one or more of many different factors or metrics.

16 Claims, 12 Drawing Sheets

(56) References Cited

U.S. PATENT DOCUMENTS

| | | | |
|---|---|---|---|
| 4,185,730 | A | 1/1980 | Roes et al. |
| 4,319,674 | A | 3/1982 | Riggs et al. |
| 4,323,240 | A | 4/1982 | Stewart et al. |
| 4,674,618 | A | 6/1987 | Eglise et al. |
| 4,725,924 | A | 2/1988 | Juan |
| 4,755,941 | A | 7/1988 | Bacchi |
| 4,758,689 | A | 7/1988 | Nakao et al. |
| 4,764,666 | A | 8/1988 | Bergeron |
| 4,778,182 | A | 10/1988 | Brignole |
| 4,814,589 | A | 3/1989 | Storch et al. |
| 4,827,640 | A | 5/1989 | Jones |
| 4,882,473 | A | 11/1989 | Bergeron et al. |
| 4,926,996 | A | 5/1990 | Eglise et al. |
| 4,943,090 | A | 7/1990 | Fienberg |
| 4,968,873 | A | 11/1990 | Dethloff et al. |
| 4,969,549 | A | 11/1990 | Eglise |
| 4,983,820 | A | 1/1991 | Dias |
| 4,999,742 | A | 3/1991 | Stampfli |
| 5,007,641 | A | 4/1991 | Seidman |
| 5,056,141 | A | 10/1991 | Dyke |
| 5,103,081 | A | 4/1992 | Fisher et al. |
| 5,128,752 | A | 7/1992 | Von Kohorn |
| 5,166,502 | A | 11/1992 | Rendleman et al. |
| 5,216,234 | A | 6/1993 | Bell |
| 5,276,312 | A | 1/1994 | McCarthy |
| 5,277,424 | A | 1/1994 | Wilms |
| 5,326,104 | A | 7/1994 | Pease et al. |
| 5,361,885 | A | 11/1994 | Modler |
| 5,373,440 | A | 12/1994 | Cohen et al. |
| 5,399,847 | A | 3/1995 | Droz |
| 5,406,264 | A | 4/1995 | Plonsky et al. |
| 5,450,938 | A | 9/1995 | Rademacher |
| 5,498,859 | A | 3/1996 | Farmont |
| 5,505,449 | A | 4/1996 | Eberhardt et al. |
| 5,569,082 | A | 10/1996 | Kaye |
| 5,588,526 | A | 12/1996 | Blumberg et al. |
| 5,607,156 | A | 3/1997 | Samarasinghe |
| 5,619,066 | A | 4/1997 | Curry et al. |
| 5,627,356 | A | 5/1997 | Takemoto et al. |
| 5,651,548 | A | 7/1997 | French et al. |
| 5,655,961 | A | 8/1997 | Acres et al. |
| 5,667,218 | A | 9/1997 | Kumabe et al. |
| 5,676,376 | A | 10/1997 | Valley |
| 5,700,009 | A | 12/1997 | Meoni |
| 5,706,925 | A | 1/1998 | Orus et al. |
| 5,709,603 | A | 1/1998 | Kaye |
| 5,735,742 | A | 4/1998 | French |
| 5,764,789 | A | 6/1998 | Pare, Jr. et al. |
| 5,768,143 | A | 6/1998 | Fujimoto |
| 5,770,533 | A | 6/1998 | Franchi |
| 5,778,067 | A | 7/1998 | Jones et al. |
| 5,781,647 | A | 7/1998 | Fishbine et al. |
| 5,839,956 | A | 11/1998 | Takemoto |
| 5,855,515 | A | 1/1999 | Pease et al. |
| 5,892,210 | A | 4/1999 | Levasseur |
| 5,895,321 | A | 4/1999 | Gassies et al. |
| 5,902,983 | A | 5/1999 | Crevelt et al. |
| 5,910,048 | A | 6/1999 | Feinberg |
| 5,919,090 | A | 7/1999 | Mothwurf |
| 5,967,516 | A | 10/1999 | Phillips |
| 5,969,633 | A | 10/1999 | Roster |
| 6,003,651 | A | 12/1999 | Waller et al. |
| 6,012,832 | A | 1/2000 | Saunders et al. |
| 6,021,949 | A | 2/2000 | Boiron |
| 6,032,955 | A | 3/2000 | Luciano et al. |
| 6,048,269 | A | 4/2000 | Burns et al. |
| 6,050,487 | A | 4/2000 | Bonifas et al. |
| 6,050,895 | A | 4/2000 | Luciano, Jr. et al. |
| 6,062,981 | A | 5/2000 | Luciano, Jr. |
| 6,099,408 | A | 8/2000 | Schneier et al. |
| 6,109,530 | A | 8/2000 | Larson et al. |
| 6,110,042 | A | 8/2000 | Walker et al. |
| 6,138,106 | A | 10/2000 | Walker et al. |
| 6,148,094 | A | 11/2000 | Kinsella |
| 6,186,895 | B1 | 2/2001 | Oliver |
| 6,193,153 | B1 | 2/2001 | Lambert |
| 6,200,218 | B1 | 3/2001 | Lindsay |
| 6,213,874 | B1 | 4/2001 | Heflin |
| 6,227,972 | B1 | 5/2001 | Walker et al. |
| 6,257,979 | B1 | 7/2001 | Walker et al. |
| 6,264,109 | B1 | 7/2001 | Chapet et al. |
| 6,270,410 | B1 | 8/2001 | DeMar et al. |
| 6,296,190 | B1 | 10/2001 | Rendleman |
| 6,330,162 | B2 | 12/2001 | Sakamoto et al. |
| 6,357,746 | B1 | 3/2002 | Sadowski |
| 6,358,149 | B1 | 3/2002 | Schneider et al. |
| 6,405,174 | B1 | 6/2002 | Walker et al. |
| 6,454,651 | B1 | 9/2002 | Yoseloff |
| 6,464,583 | B1 | 10/2002 | Kidron |
| 6,500,067 | B1 | 12/2002 | Luciano et al. |
| 6,575,832 | B1 | 6/2003 | Manfredi et al. |
| 6,581,747 | B1 | 6/2003 | Charlier et al. |
| 6,616,535 | B1 | 9/2003 | Nishizaki et al. |
| 6,629,591 | B1 | 10/2003 | Griswold et al. |
| 6,641,035 | B1 | 11/2003 | Predescu et al. |
| 6,675,152 | B1 | 1/2004 | Prasad et al. |
| 6,688,976 | B1 | 2/2004 | Tulley et al. |
| 7,267,614 | B1 | 9/2007 | Jorasch et al. |
| 7,549,920 | B2 | 6/2009 | Jorasch et al. |
| 7,719,424 | B2 | 5/2010 | Steil |
| 7,753,779 | B2 | 7/2010 | Shayesteh |
| 7,753,781 | B2 | 7/2010 | Storch |
| 7,753,797 | B2 | 7/2010 | Walker et al. |
| 7,762,887 | B1 | 7/2010 | House et al. |
| 7,771,272 | B2 | 8/2010 | Soltys et al. |
| 7,822,641 | B2 | 10/2010 | Abbott et al. |
| 7,852,223 | B2 | 12/2010 | Hecht et al. |
| 7,878,896 | B2 | 2/2011 | Jorasch et al. |
| 7,883,408 | B2 | 2/2011 | Gelinotte |
| 7,913,918 | B2 | 3/2011 | Zellner et al. |
| 7,914,372 | B2 | 3/2011 | Tessmer et al. |
| 7,918,455 | B2 | 4/2011 | Chapet et al. |
| 8,029,357 | B2 | 10/2011 | Jorasch et al. |
| 8,096,872 | B2 | 1/2012 | Walker et al. |
| 8,167,705 | B2 | 5/2012 | Jorasch et al. |
| 8,353,759 | B2 * | 1/2013 | Thorson et al. ............ 463/25 |
| 8,382,582 | B2 * | 2/2013 | Sammon et al. ............ 463/25 |
| 2001/0006195 | A1 | 7/2001 | Sukeda et al. |
| 2002/0068629 | A1 | 6/2002 | Allen et al. |
| 2004/0229671 | A1 | 11/2004 | Stronach et al. |
| 2004/0229682 | A1 | 11/2004 | Gelinotte |
| 2004/0254006 | A1 | 12/2004 | Lam et al. |
| 2005/0026674 | A1 | 2/2005 | Wolf et al. |
| 2005/0059482 | A1 | 3/2005 | Hedrick et al. |
| 2005/0251447 | A1 | 11/2005 | Lane |
| 2005/0282627 | A1 | 12/2005 | Hedrick et al. |
| 2006/0063587 | A1 | 3/2006 | Manzo |
| 2006/0073883 | A1 | 4/2006 | Franks, Jr. |
| 2006/0094498 | A1 | 5/2006 | Jorasch et al. |
| 2006/0121984 | A1 | 6/2006 | Jorasch et al. |
| 2006/0128462 | A1 | 6/2006 | Jorasch et al. |
| 2006/0217186 | A1 | 9/2006 | Jorasch et al. |
| 2007/0094721 | A1 | 4/2007 | Nguyen et al. |
| 2007/0105613 | A1 | 5/2007 | Adams et al. |
| 2007/0293309 | A1 | 12/2007 | Jorasch et al. |
| 2008/0176642 | A1 | 7/2008 | Phillips et al. |
| 2010/0093428 | A1 | 4/2010 | Mattice et al. |
| 2010/0093429 | A1 | 4/2010 | Mattice et al. |
| 2010/0285869 | A1 | 11/2010 | Walker et al. |

FOREIGN PATENT DOCUMENTS

| | | |
|---|---|---|
| WO | WO9617329 | 6/1996 |
| WO | WO9835309 | 8/1998 |

OTHER PUBLICATIONS

"What is Mondex?" (http // www mondex.com/mondex/cgi-bin), download date: Apr. 26, 2000, 1pg.

Woods, Adam, "Woolworth Play a New Tune with Loyalty Stickers", Precision Marketing, News Section, p. 3, Jul. 14, 1997, 1pg.

White, Dale, "Bradenton Merchants Unite to Help Build Downtown", Sarasota Herald-Tribune, Local/State Section, p. 1B, Mar. 4, 1998, 2pp.

(56) References Cited

OTHER PUBLICATIONS

Young, Virginia, "Bill Is Approved That Would Exempt Children's Arcades From Gaming Laws; Kids Couldn't Win More Than They Paid to Play", St. Louis Post-Dispatch, News Section; p. A1, May 17, 1999, 2pp.
"ERG", AAP Newsfeed, Nationwide General News Section, Finance Wire Section, May 27, 1999, 2pp.
Tapscott, Don, "Reaching the Internet Generation", Credit Union Executive, No. 1, vol. 40, p. 24, ISSN: 0011-1058, Jan. 1, 2000, 5pp.
Guernsey, Lisa, "Scanners You Can Take to the Library", The New York Times, Section G, p. 13, col. 1, Circuits, Jan. 20, 2000, 3pp.
"New Bus Service to Metrolink Hub Set", The Press-Enterprise, Local Section, p. B03, Jan. 25, 2000, 1 pg.
Arave, Lynn, "S.L. Loses Controversial Talk Show", The Desert News, Weekend Section, p. W05, Feb. 4, 2000, 2pp.
Jones, Tricia, "Eye Spy: Coupon Booklet Caters to Pets", The Columbian (Vancouver, WA), Life Section, p. el, Feb. 9, 2000, 2pp.
McCabe, Diane, "Where's the Jingle? Fans of Plastic Want to Cash in on Smart-Card Technology, Although Most Consumers See Little or no Reason to Break Their Nickel-and-Dine Ways", The San Diego Union Tribune, Business Section, p. 1-3, Mar. 5, 2000, 3pp.
Lubinger, Bill, "Gateway Hilton Planned for 2001", The Plain Dealer, Business Section, p. 1H, Apr. 9, 2000, 3pp.
Lawrence, Bob, "eBet Expands Further with Purchase of Netcash_2", AAP Newsfeed, Nationwide General News Section, Finance Wire Section, Apr. 10, 2000, 1 pg.
"How to Use MetroCard", New York City Transit Online, download date Apr. 26, 2000, 2pp.
"About MetroCard & Transit Information", MetroCard.CitySearch.com, download date: Apr. 26, 2000, 6pp.
"AT&T Prepaid Phone Card, It's All Within Your Reach", (http //www.att.com/prepaidcard), download date: Jun. 12, 2000, 3 pp.
Definition of Lottery from the Encyclopedia Britannica, 1pg.
Orwall, Bruce, "Playing Slots? Casinos Know You", The Orange County Register, Dec. 26, 1995, Morning Edition, Section: Business; p. C01, 3pp.
Friedman, Lisa, "Getting Their Ducks in a Row", International Gaming and Wagering Business, Aug. 1996, Section: p. S10: ISSN: 8750-8222, 5pp.
Taylor Parets, Robyn, "The Newer DEAL", International Gaming and Wagering Business, Apr. 1997, Section: p. 27; ISSN: 8750-8222, 4pp.
Hasbro Inc. "Trivial Pursuit 10th Anniversary Edition Master Game", (http // wwwhasbro.com/common/instruct/Trivial Pursuit (10thanniversaryedition mastergame)) 1992, 2pp.
Thomas Lucas M. "Ninja Gaiden II: The Dark Sword of Chaos Review", (http //wii igncom/articles/827/827325 p. 1 html) 1990, 1pg.
Office Action for U.S. Appl. No. 09/597,801, dated Nov. 7, 2001, 6pp.
Office Action for U.S. Appl. No. 09/597,801, dated Sep. 25, 2002, 6pp.
Office Action for U.S. Appl. No. 09/597,801, dated Jan. 2, 2003, 6pp.
Office Action for U.S. Appl. No. 09/597,801, dated Aug. 5, 2003, 7pp.
Office Action for U.S. Appl. No. 09/597,801, dated Apr. 6, 2004, 13pp.
Office Action for U.S. Appl. No. 09/597,801, dated Jan. 13, 2005, 12pp.
Appeal Brief for U.S. Appl. No. 09/597,801, dated Nov. 21, 2005, 61 pp.
Notice of Allowance for U.S. Appl. No. 09/597,801, dated Jun. 4, 2007, 6pp.
Interview Summary for U.S. Appl. No. 09/597,801 dated Feb. 7, 2002. 3pp.
Office Action for U.S. Appl. No. 09/597,801 dated Jan. 23, 2003, 3pp.
Interview Summary for U.S. Appl. No. 09/597,801 dated Nov. 26, 2003, 4pp.
Appeal Brief for U.S. Appl. No. 11/321,793 dated Jun. 6, 2008, 99pp.
Office Action for U.S. Appl. No. 11/321,793 dated Jan. 9, 2008, 8Pp.
Office Action for U.S. Appl. No. 11/321,793 dated Aug. 14, 2007, 6pp.
Office Action for U.S. Appl. No. 11/329,872 dated Apr. 25, 2008, 7pp.
Office Action for U.S. Appl. No. 11/361,152 dated Feb. 26, 2008, 6pp.
Office Action for U.S. Appl. No. 11/361,152 dated Jun. 16, 2008, 5pp.
International Search Report for Application PCT/US2007/079518 May 13, 2008, 4pp.
Written Opinion for Application No. PCT/2007/079518 dated May 13, 2008, 14pp.
Pending PCT Application No. PCT/US08/57821, entitled "Gameplay-Altering Protable Wagering Media", filed Mar. 21, 2008, 158pp.

* cited by examiner

| PLAYER_ID 752-1 | PLAYER_TYPE 752-2 | CHIP_ID 752-3 |
|---|---|---|
| 14590 | GOLD | AG67D93 |
| 14590 | GOLD | G81AVG49 |
| ASJFT | TOUR GROUP 1 | NONE |
| AL@MAC.COM | PRESIDENTIAL | X837 |
| AL@MAC.COM | PRESIDENTIAL | X838 |
| AL@MAC.COM | PRESIDENTIAL | X839 |
| AL@MAC.COM | PRESIDENTIAL | X840 |
| BIGBETTER345 | TOUR GROUP 1 | X845-Y625 |

| CHIP_ID 854-1 | CHIP_VALUE 854-2a | CHIP_OWNER 854-2d | CHIP_STATUS 854-2 ||| RULES 854-3 |
|---|---|---|---|---|---|---|
| | | | CHIP_LOCATION 854-2b | CHIP_DISPLAY 854-2c | | |
| 1 | $1 | PLAYER #14590 | CHIP TRAY #2 AT ROULETTE TABLE #109 | OFF | | NONE |
| 2 | $5 | PLAYER #14590 | BET ON "EVEN" AT ROULETTE TABLE #109 | GLOWING GREEN | | GLOW GREEN TO INDICATE WINNING BET THAT SHOULD BE PAID OFF BY CROUPIER |
| 3 | $5 | PLAYER #14590 | BET ON "RED" AT ROULETTE TABLE #109 | BLINKING YELLOW | | BLINK YELLOW TO INDICATE LOSING BET THAT SHOULD BE REMOVED FROM FELT BY CROUPIER |
| 4 | $1 | PLAYER #14590 | BET ON "COLUMN 1" AT ROULETTE TABLE #109 | OFF | | TURN OFF IF CROUPIER HAS ALREADY MADE PAYOUT FOR WINNING BET |
| 5 | $10 | CASINO | CHIP TRAY #3 AT ROULETTE TABLE #241 | OFF | | TURN OFF IF CHIP NOT IN PLAY |
| 6 | $10 | PLAYER #79802 | CHIP #1 IN STACK OF CHIPS BET ON "BLACK" AT ROULETTE TABLE #241 | OFF (BOTTOM CHIP IN STACK) | | TURN OFF IF CHIP COVERED BY OTHER CHIP |
| 7 | $10 | PLAYER #79802 | CHIP #2 IN STACK OF CHIPS BET ON "BLACK" AT ROULETTE TABLE #241 | OFF (MIDDLE CHIP IN STACK) | | TURN OFF IF CHIP NOT TOP CHIP IN STACK |
| 8 | $5 | PLAYER #79802 | CHIP #3 IN STACK OF CHIPS BET ON "BLACK" AT ROULETTE TABLE #241 | $25* (TOTAL VALUE OF CHIPS IN STACK) | | SHOW TOTAL VALUE OF STACK |
| 9 | $10 | PLAYER #79802 | CHIP TRAY #3 AT ROULETTE TABLE #241 | BLINKING GREEN | | BLINK GREEN TO INDICATE THAT CHIP HAS NOT BEEN WAGERED RECENTLY |

FIG. 8A

| CHIP_ID 854-1 | CHIP_VALUE 854-2a | CHIP_OWNER 854-2a | CHIP_STATUS 854-2 | | RULES 854-3 |
|---|---|---|---|---|---|
| | | | CHIP_LOCATION 854-2b | CHIP_DISPLAY 854-2c | |
| 10 | $10 | PLAYER #49937 | BET ON "27" AT ROULETTE TABLE #241 | BLINKING RED | BLINK RED TO INDICATE LATE BET |
| 11 | $5 | PLAYER #50854 | NEAR SEAT #4 AT POKER TABLE #985 | GLOWING YELLOW | GLOW YELLOW TO INDICATE THAT PLAYER HAS GOLD-LEVEL COMP STATUS |
| 12 | $5 | PLAYER #29351 | NEAR SEAT #1 AT POKER TABLE #985 | BEEPING | BEEP TO WARN PLAYER THAT HE HAS A LOW CHIP COUNT |
| 13 | $5 | PLAYER #30854 | IN POT OF POKER TABLE #985 | OFF | NONE |
| 14 | $5 | PLAYER #30854 | IN POT OF POKER TABLE #985 | GLOWING YELLOW | GLOW YELLOW TO INDICATE THAT CHIP IS PART OF RAKE |
| 15 | $5 | PLAYER #67831 | NEAR SEAT #2 AT BLACKJACK TABLE #670 | GLOWING BRIGHT RED TO INDICATE THAT CHIP IS "HOT" (LOTS OF WINNING BETS RECENTLY) | GLOW BRIGHT RED IF > 6 WINNING BETS WITH CHIP IN LAST HOUR |
| 16 | $5 | PLAYER #67831 | NEAR SEAT #2 AT BLACKJACK TABLE #670 | GLOWING MEDIUM RED TO INDICATE THAT CHIP IS "WARM" (SOME WINNING BETS RECENTLY) | GLOW MEDIUM RED IF > 2 WINNING BETS WITH CHIP IN LAST HALF HOUR |
| 17 | $10 | PLAYER #67831 | NEAR SEAT #2 AT BLACKJACK TABLE #670 | OFF (CHIP IS "COLD" - FEW WINNING BETS RECENTLY) | TURN OFF IF < 2 WINNING BETS IN LAST 6 GAME PLAYS |
| 18 | $10 | PLAYER #23420 | BET ON "PASS" AT CRAPS TABLE #222 | GLOWING BLUE TO INDICATE THAT CHIP BELONGS TO PLAYER #23420 | GLOW IN ASSIGNED PLAYER COLOR |
| 19 | $25 | PLAYER #87349 | BET ON "PASS" AT CRAPS TABLE #222 | PLAYING RINGTONE OF PLAYER #87349 | PLAY RINGTONE OF PLAYER UPON WIN |
| 20 | $10 | PLAYER #87349 | IN CHIP TRAY #1 AT CRAPS TABLE #222 | "4" (CURRENT WINNING STREAK ASSOCIATED THIS CHIP) | DISPLAY WIN STREAK UPON CHIP MOTION |

SYSTEMS AND METHODS FOR PORTABLE WAGERING MEDIUMS

PRIORITY CLAIM

This application is a continuation of, claims priority to and the benefit of U.S. patent application Ser. No. 12/067,694, which is a national stage application of, claims priority to and the benefit of PCT/US2007/079518, filed on Sep. 26, 2007, which claims priority to and the benefit of U.S. Provisional Patent Application Ser. No. 60/826,977, filed on Sep. 26, 2006, the entire contents of each are incorporated by reference herein.

CROSS-REFERENCE TO RELATED APPLICATIONS

The present application is also related to: (i) U.S. patent application Ser. No. 11/838,551 entitled "GAMING TOKEN HAVING A VARIABLE VALUE" filed on Aug. 14, 2007, which is a continuation application that claims benefit and priority to U.S. patent application Ser. No. 09/597,801 entitled "GAMING TOKEN HAVING A VARIABLE VALUE" filed on Jun. 20, 2000, which issued as U.S. Pat. No. 7,267,614 on Sep. 11, 2007, and (ii) (a) U.S. patent application Ser. No. 11/321,793 entitled "GAMING TOKEN HAVING A VARIABLE VALUE" filed on Dec. 29, 2005, (b) U.S. patent application Ser. No. 11/329,872 entitled "GAMING TOKEN HAVING A VARIABLE VALUE" filed on Jan. 11, 2006, (c) U.S. patent application Ser. No. 11/331,550 entitled "GAMING TOKEN HAVING A VARIABLE VALUE" filed on Jan. 13, 2006, and (d) U.S. patent application Ser. No. 11/361,152 entitled "GAMING TOKEN HAVING A VARIABLE VALUE" filed on Feb. 24, 2006, each of which is a divisional application that also claims benefit and priority to U.S. patent application Ser. No. 09/597,801 entitled "GAMING TOKEN HAVING A VARIABLE VALUE" filed on Jun. 20, 2000, which issued as U.S. Pat. No. 7,267,614 on Sep. 11, 2007. The entirety of each of these applications is hereby incorporated by reference herein.

BACKGROUND

Tokens, chips, cashless gaming tickets, and other portable wagering mediums are often utilized to place wagers in various wagering games such as poker, blackjack, roulette, craps, slots, pai gow, etc. Such portable wagering mediums, however, are generally nothing more than indicators of a face value associated therewith. Typical portable wagering mediums have not been configured or utilized, for example, to increase player enjoyment, increase ease of play of a wagering game, or increase wagering game efficiency. These and other deficiencies of typical portable wagering mediums are addressed by the systems and methods disclosed herein.

BRIEF DESCRIPTION OF THE DRAWINGS

An understanding of embodiments described herein and many of the attendant advantages thereof may be readily obtained by reference to the following detailed description when considered with the accompanying drawings, wherein:

FIGS. 8A and 8B (collectively "FIG. 8") are a block diagram of a data storage structure according to some embodiments;

DETAILED DESCRIPTION

I. Introduction

Figure 1:
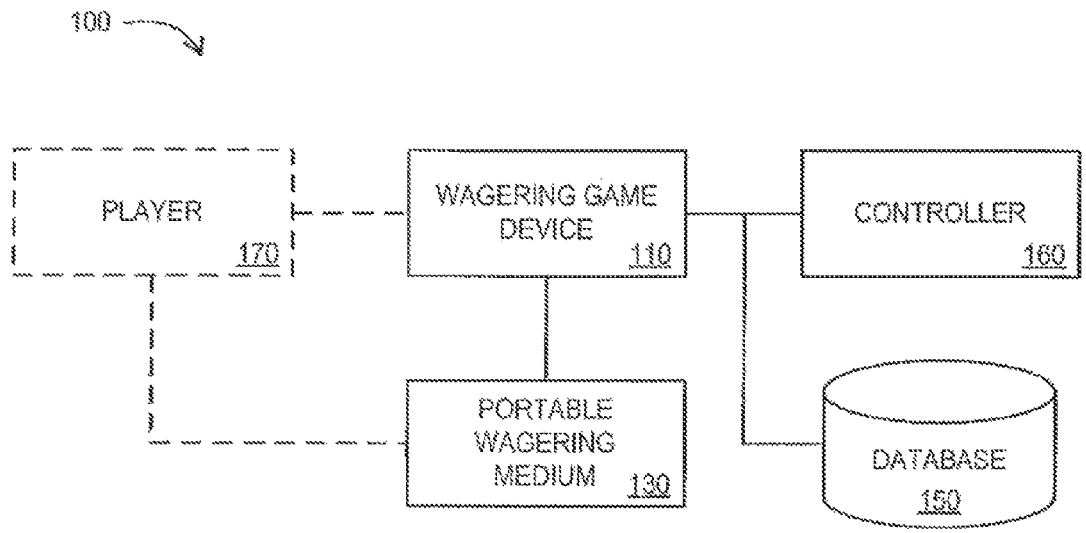
FIG. 1 is a block diagram of a system according to some embodiments.

Applicants have recognized that, in some situations, it may be advantageous to provide a portable wagering medium that is capable of outputting various indications related to one or more potential or current statuses of the portable wagering medium. Applicants have also recognized that it may be advantageous to provide a wagering game device that is operable to (i) determine a status of a portable wagering medium and (ii) cause, based on the determining, an outputting of an indication of the status via an output device coupled to the portable wagering medium. It may also or alternatively be advantageous for a central server or other device to determine the status and/or cause the outputting.

Applicants have also recognized that it may be advantageous to provide a portable wagering medium configured to (i) receive, from a device separate from the portable wagering medium, an indication of a status and (ii) output, by an output device coupled to the portable wagering medium and in response to a receiving of the indication of the status, the indication of the status.

The status of the portable wagering medium may be based on one or more of many different factors or metrics. The status may be based on, for example, (i) an event in a wagering game in which the portable wagering medium is utilized to place a wager, (ii) a time associated with the portable wagering medium, (iii) a usage limitation of the portable wagering medium, (iv) a proximity of the portable wagering medium to another portable wagering medium, (v) a wagering history of the portable wagering medium, (vi) a current location of the portable wagering medium, and/or (vii) an entity associated with the portable wagering medium.

Applicants have recognized that providing such a wagering game device and/or a portable wagering medium (and/or otherwise practicing the methods described herein) may be beneficial in many ways.

Embodiments described herein may, for example, generally help avoid mistakes by dealers and/or other employees of a casino. Miscalculations by a dealer may be substantially avoided or prevented in some embodiments, such as in the case that a display device coupled to a portable wagering medium outputs an indication of how much to pay out for a winning bet. Embodiments described herein may also or alternatively make it easier for a dealer to recognize bets, such as in the case that one or more portable wagering mediums are involved in a losing bet (e.g., at a table game) and such mediums may blink to indicate to a dealer that they should be removed from the game (e.g., from the "felt" of the gaming table).

Embodiments described herein may also or alternatively help avoid confusion and disagreements with players, such as in the case that a portable wagering medium that is used to place an ambiguous bet (e.g., on a line between two bet boxes) may blink to highlight this ambiguity to a dealer.

Embodiments described herein may also or alternatively generally help players to track and/or make their bets. Embodiments may, for example, help avoid confusion as to which player placed a bet, such as in the case that a portable wagering medium owned and/or possessed by a player may display the player's name and/or another player identifier on an integrated display device. Some embodiments may help players keep track of which gaming chips are "lucky" (and those that are not), such as in the case that portable wagering mediums that have been used to place winning bets more than a certain number of times (such as three (3) times) during a certain time period (such as the last five (5) minutes) may be considered "hot" and therefore glow red. Some embodiments may help players to keep track of where portable wagering mediums came from, such as in the case that a portable wagering medium that was purchased by a player may glow green, whereas a portable wagering medium won by a player may glow purple. This may, for example, help the player manage their bankroll by allowing the player to quickly see if the player is "up" or "down" (e.g., whether the player has net winnings or losses). Some embodiments may help a player determine the total potential payout for a bet, such as in the case that a player places a bet on a game table using a portable wagering medium, the portable wagering medium may display the potential payout associated with the bet (e.g., the portable wagering medium may display "Pays $10" for a five dollar ($5) bet on the numbers one through twelve (1-12) in roulette). This may help players, for example, to more easily select bets that are desirable and/or favorable to the player (e.g., bets with big payouts and/or bets with good odds).

Embodiments described herein may also or alternatively generally provide enhanced entertainment to players. Embodiments may, for example, provide for portable wagering mediums that glow bright red when they are "hot" (e.g., when they have been utilized to place a certain number of winning bets). The "hotness" from these portable wagering mediums may, in some embodiments, "rub off" onto nearby portable wagering mediums, causing the nearby portable wagering mediums to glow medium red to indicate that they are "medium hot". Embodiments may also or alternatively provide for portable wagering mediums that blink and/or play a jingle (such as a ring tone associated with the player—e.g., transmitted from a device associated with the player, such as the player's cell phone) when utilized to place a winning bet, such as to celebrate a player's win. Embodiments may also or alternatively provide for a portable wagering medium that displays a player's status in a casino's complimentary program (e.g., portable wagering mediums that glow yellow for gold-level players and white for silver-level players), allowing, for example, the player to gain recognition for the player's "high roller" status.

Embodiments described herein may also or alternatively generally provide enhanced casino security. Embodiments may, for example, facilitate detection of illegal bets by providing a portable wagering medium that indicates (e.g., by glowing red) that a bet associated with the portable wagering medium was placed after the end of legal betting. Counterfeit and/or tampered portable wagering mediums may also or alternatively be detected, such as in the case that a portable wagering medium that is not authentic or that has been tampered with may not light up or may display a "Tampered" message.

Other features, advantages, and benefits should be easily discernable to one of ordinary skill in the art upon having read the disclosure of the embodiments presented herein.

II. Terms and Definitions

Throughout the description that follows and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting.

Some embodiments described herein are associated with a "wagering game device". As used herein, the term "wagering game device" may generally refer to any device that is operable to execute, facilitate the execution of, and/or monitor a wagering game and/or wagering game program. Wagering game devices may comprise, for example, one or more slot machines, video poker machines, video keno machines, video roulette machines, video blackjack machines, video lottery machines, pachinko machines, slot or other electronic game hubs and/or controllers, other electronic gaming machines, and/or one or more table or table-top games and/or table or table-top game devices such as may be utilized to conduct, facilitate, and/or monitor one or more poker, roulette, blackjack, pai gow, pai gow poker, baccarat, and/or other wagering games.

In some embodiments, a wagering game device may generally be implemented as a system controller, a dedicated hardware circuit, an appropriately programmed general-purpose computer, or any other equivalent electronic, mechanical or electro-mechanical device. Wagering game devices may comprise, for example, Personal Computer (PC) devices (e.g., that communicate with an online casino Web site), laptop and/or tablet computers, Personal Digital Assistant (PDA) devices, cellular or other wireless telephones (e.g., an Apple® iPhone™; e.g., to communicate with an automated sports book that provides gaming services), and/or handheld or portable wagering game devices.

A wagering game device may comprise any or all of the gaming devices of the aforementioned systems. In some embodiments, a user device such as a PDA or cell phone may be used in place of or in addition to some or all of the wagering game device components. For example, in some embodiments, a wagering game device may comprise a wireless handheld device similar to the WifiCasino™ GS offered by Diamond I Technologies of Baton Rouge, La. Further, a wagering game device may comprise a PC or other device, which may be operable to communicate with an online casino and facilitate game play at the online casino. In one or more embodiments, the wagering game device may comprise a computing device operable to execute software that simulates play of a reeled slot machine game, video poker game, video blackjack game, video keno game, video roulette game, and/or lottery game.

Some embodiments described herein are associated with the terms "game" or "wagering game". As used herein, the terms "game" and "wagering game" may be utilized interchangeably and may generally refer to any wagering activity conducted in accordance with a particular set of rules via which a prize or benefit may be won in exchange for consideration. In some embodiments, a wagering game may comprise and/or be otherwise associated with execution of a game of chance, a game of skill, and/or a hybrid game of chance and skill.

Some embodiments described herein are associated with one or more "types" of games. As used herein, a "type" of game may generally refer to a category and/or group of games that share one or more characteristics (e.g., themes, paytables, rules, and/or probabilities).

Some embodiments described herein are associated with the term "game play". As used herein, the term "game play" may generally refer to a single instance, execution, spin, hand, and/or round of a game. A game play may result in a single outcome (e.g., set of indicia and corresponding payout, if any).

As used herein, the term "outcome" may generally refer to any result of a game play, which may generally be indicated by a payout (i.e., a prize or benefit to be provided as a result of the game play) and/or one or more indicia representative of the result. For example, an outcome may comprise a set of indicia (or payout corresponding thereto) that may be displayed along a payline of a reeled slot machine. In another example, an outcome may comprise a roulette number that is a result of a roulette spin. In some embodiments, an outcome may comprise a determination that one or more players and/or a dealer at a table game have won or lost a particular hand or round of betting. In some embodiments, more than one set of indicia may represent the same result or outcome.

Some embodiments described herein are associated with a "portable wagering medium". As used herein, the term "portable wagering medium" may generally refer to any object, device, component, chip, puck, check (or cheque), token, ticket, marker, lamer, plaque, and/or substrate that is operable to be utilized to place a wager in a wagering game (e.g., a wagering game facilitated by a wagering game device as described herein). A portable wagering medium may, for example, comprise the consideration (or a portion of the consideration) supplied by a player in exchange for a chance or opportunity to win a prize or other benefit in a wagering game. Such portable wagering mediums, are, by virtue of being utilized to place a wager in a wagering game and/or by virtue of being representative of wagering consideration, "gambled". In other words, such portable wagering mediums are surrendered upon occurrence of a losing outcome. Other portable wagering mediums may not generally be surrendered or forfeited upon occurrence of a losing outcome in a wagering game (e.g., the portable wagering medium, while being utilized to facilitate placing of a wager, may not itself be offered as consideration for placing the wager).

As used herein, the term "wagering chip" generally refers to a class of portable wagering mediums that are utilized as consideration in placing wagers in wagering games conducted at gaming tables (including "smart" and/or electronically enhanced gaming tables). Wagering chips are generally coin and/or circularly shaped, but may also or alternatively be otherwise shaped (e.g., square, elliptical, octagonal, triangular, and/or amorphously or irregularly shaped). Such wagering chips are typically placed, by a player and/or dealer, upon one or more playing surfaces such as the "felt" of a poker table, to place one or more wagers.

Wagering chips also typically indicate a particular value (e.g., a face value) associated with each wagering chip (e.g., a five dollar ($5) wagering chip will typically be imprinted with a "$5" indication and/or may be painted or emblazoned with a particular color and/or texture pattern to indicate the five dollar ($5) value). In some embodiments, markers, lamers, plaques, and/or cashless gaming tickets may be utilized as wagering chips in table-based wagering games. "Wagering plaques" are similar to wagering chips, for example, yet are typically utilized to represent larger denominations of value and also therefore typically include indicia of serial numbers to uniquely identify and/or track such high-value portable wagering mediums. Many jurisdictions in the United States of America have different regulations governing colors, sizes, indicia, and uses that are appropriate for wagering chips. It is recommended that embodiments herein be practiced in accordance with all local, state, and federal wagering chip rules, regulations, and/or statutes; which should be easily accomplished by one of ordinary skill in the art.

Some embodiments described herein are associated with an "input device". As used herein, the term "input device" may generally refer to any device that is used to receive or process input. An input device may communicate with and/or be part of another device (e.g., a wagering game device). Some examples of input devices include, but are not limited to: a button, a key, one or more softkeys and/or variable function input devices, a bar-code scanner, a magnetic stripe reader, a computer keyboard, a pointing device (e.g., a computer mouse, touchpad, and/or trackball), a point-of-sale terminal keypad, a touch-screen, a microphone, an infrared sensor, a sonic ranger, a computer port, a video camera, a motion detector, an accelerometer, a thermometer, a digital camera, a network card, a Universal Serial Bus (USB) port, a Global Positioning System (GPS) receiver, a Radio Frequency IDentification (RFID) receiver, a RF receiver, a pressure sensor, and a weight scale or mass balance.

Some embodiments described herein are associated with an "output device". As used herein, the term "output device" may generally refer to a device that is used to output information. An output device may communicate with and/or be part of another device (e.g., a wagering game device). Some examples of output devices may include, but are not limited to: a Cathode Ray Tube (CRT) monitor, a Liquid Crystal Display (LCD) screen, a Light Emitting Diode (LED) screen, a printer, an audio speaker (or other sound or noise-producing device), an Infra-red Radiation (IR) transmitter, a RF transmitter, a vibration device, an olfactory emitter, and/or a data port.

Some embodiments herein are associated with "communication". As used herein, the term "communication" may refer to any information, data, and/or signal that is provided, transmitted, received, and/or otherwise processed by an entity, and/or that is shared or exchanged between two or more people, devices, and/or other entities. Communications may be external to one or more devices, internal (e.g., within a device and/or component), wired, wireless, continuous, and/or intermittent. Communications may involve, for example, one or more of transmitting, receiving, relaying, processing, and/or otherwise interfacing with information and/or data. Some, but not all, possible communication networks that may be utilized for such communications include: a Local Area Network (LAN), a Wide Area Network (WAN), the Internet, a telephone line (e.g., a Public Switched Telephone Network (PSTN)), a cable line, a radio channel, an optical communications line, and/or a satellite communications link. A variety of communications protocols may be utilized to facilitate and/or conduct such communications, including but not limited to: Ethernet (or IEEE 802.3), Internetwork Packet Exchange IPX), Service Advertising Protocol (SAP), Slot Accounting System (SAS™) SuperSAS™, Asynchronous Transfer Protocol (ATP), Bluetooth®, and/or Transmission Control Protocol (TCP)/Internet Protocol (IP). Further, in some embodiments, various communications protocols endorsed by the Gaming Standards Association of Fremont, Calif., may be utilized, such as (i) the Gaming Device Standard (GDS), which may facilitate communication between a gaming device and various component devices and/or peripheral devices (e.g., printers, bill acceptors, etc.), (ii) the Best of Breed (BOB) standard, which may facilitate communication between a gaming device and various servers related to play of one or more gaming devices (e.g., servers that assist in providing accounting, player tracking, content management, ticket-in/ticket-out and progressive jackpot functionality), and/or (iii) the System-to-System (S2S) standard, which may facilitate communication between game-related servers and/or casino property management servers (e.g., a hotel server comprising one or more databases that store information about booking and reservations). Communications may be encrypted to ensure privacy and prevent fraud in any of a variety of ways that are or become known or practicable.

Devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

As used herein, the terms "information" and "data" may be used interchangeably and may refer to any data, text, voice, video, image, message, bit, packet, pulse, tone, waveform, and/or other type or configuration of signal and/or information. Information may be or include information packets transmitted, for example, in accordance with the IP Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encrypted, and/or otherwise packaged or manipulated in accordance with any method that is or becomes known or practicable.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

As used herein, the term "coupled" may generally refer to any type or configuration of coupling that is or becomes known or practicable. Coupling may be descriptive, for example, of two or more objects, devices, and/or components that are communicatively coupled, mechanically coupled, electrically coupled, and/or magnetically coupled. The term "communicatively coupled" generally refers to any type or configuration of coupling that places two or more objects, devices, components, or portions, elements, or combinations thereof in communication. Mechanical, electrical, and magnetic communications are examples of such communications. The term "mechanically coupled" generally refers to any physical binding, adherence, attachment, and/or other form of physical contact between two or more objects, devices, components, or portions, elements, or combinations thereof. The term "electrically coupled" indicates that one or more objects, devices, components, or portions, elements, or combinations thereof, are in electrical contact such that an electrical signal, pulse, or current is capable of passing between the one or more objects, enabling the objects to electrically communicate with one another. The term "magnetically coupled" indicates that one or more objects, devices, components, or portions, elements, or combinations thereof, are within one or more associated magnetic fields. Objects may be electrically and/or magnetically coupled without themselves being physically attached or mechanically coupled. For example, objects may communicate electrically through various wireless forms of communication or may be within (at least partially) a magnetic field, without being physically touching or even adjacent.

III. System and Apparatus

A. Introduction

Generally, a wagering game device, central controller, and/or other device for use with some embodiments may comprise a device that is capable of: (i) determining a status of a portable wagering medium and (ii) causing, based on the determining, an outputting of an indication of the status via an output device coupled to the portable wagering medium. In some embodiments, The status may be based on, for example, (i) an event in a wagering game in which the portable wagering medium is utilized to place a wager, (ii) a time associated with the portable wagering medium, (iii) a usage limitation of the portable wagering medium, (iv) a proximity of the portable wagering medium to another portable wagering medium, (v) a wagering history of the portable wagering medium, (vi) a current location of the portable wagering medium, and/or (vii) an entity associated with the portable wagering medium. In some embodiments, a portable wagering medium may be configured to (i) receive, from a device separate from the portable wagering medium, an indication of a status and (ii) output, by an output device coupled to the portable wagering medium and in response to a receiving of the indication of the status, the indication of the status.

B. System

Referring first to FIG. 1, a block diagram of a system 100 according to some embodiments is shown. The various systems described herein are depicted for use in explanation, but not limitation, of described embodiments. Different types, layouts, quantities, and configurations of systems described herein may be utilized without deviating from the scope of some embodiments.

According to some embodiments, the system 100 may comprise and/or be associated with a wagering game device 110 in communication with one or more of a portable wagering medium 130, a database 150, and/or a controller 160. In some embodiments, the wagering game device 110 and/or the portable wagering medium 130 may be in communication with, coupled to, and/or otherwise associated with a player 170 (and/or a player device—not explicitly shown). Any or all of the components 110, 130, 150, 160, 170 of the system 100 may communicate via any means that is or becomes known or practicable. The components 110, 130, 150, 160, 170 of the system 100 may, for example, communicate via one or more wired and/or wireless connections. In some embodiments, more than one type of communication connection and/or means may be utilized. Some components 110, 130, 150, 160, 170 of the system 100 may communicate via one or more types of hard-wired connections, for example, while other components 110, 130, 150, 160, 170 of the system 100 may communicate utilizing one or more wireless communication protocols. Fewer or more components 110, 130, 150, 160, 170 may be included in the system 100. While a single player 170 and a single portable wagering medium 130 are depicted in FIG. 1, for example, many more players 170 and/or portable wagering mediums 130 may be included in the system 100 (e.g., such as in the case that the wagering game device 110 comprises a device associated with a table-based wagering game such as poker, that generally includes participation by a plurality of players 170).

The wagering game device 110, according to some embodiments, may comprise any type or configuration of gaming device associated with execution of a wagering game. The wagering game device 110 may comprise a wagering game table, for example, such as a High Roller Texas Hold'em Poker Table manufactured by Stine Game Tables of El Cajon, Calif., and/or various components and/or accessories thereof. In some embodiments, the wagering game device 110 may comprise a "smart" table (e.g., an electronically facilitated wagering game table) such as the PokerPro® "smart table" manufactured by PokerTek, Inc. of Mathews, N.C. According to some embodiments, the wagering game device 110 may comprise a slot machine or other electronic wagering game device and/or a peripheral device that is coupled to a table game and/or electronic wagering game device (e.g., a game monitoring and/or tracking device).

The portable wagering medium 130 may generally comprise any type or configuration of object, device, component, chip, puck, check (or cheque), token, ticket, marker, lamer, plaque, and/or substrate that is operable to be utilized to place a wager in a wagering game. In some embodiments, the portable wagering medium 130 may comprise a wagering chip, as described herein. In the case that the wagering game device 110 comprises a wagering game table and/or a "smart" wagering game table, for example, the portable wagering medium 130 may comprise one or more wagering chips positioned (e.g., by the player 170) on the wagering game table to place a bet. According to some embodiments, the portable wagering medium 130 may comprise an object that is representative of an indicated face value (e.g., a wagering chip) and/or an object that is accepted by and/or within a casino as wagering consideration. In some embodiments, for example, the portable wagering medium 130 may not comprise objects that do not indicate a face value and/or objects that are not typically accepted at casino properties as wagering consideration (e.g., the portable wagering medium 130 may not comprise, in some embodiments, a car, keys to a car, a watch, and/or cash or coins).

The database 150 may, according to some embodiments, comprise any type and/or configuration of data storage device that is or become known or practicable. The database 150 may, for example, include any appropriate combination of magnetic, optical and/or semiconductor memory. In some embodiments, the database 150 may include one or more embedded processors, communication ports, Compact Disk (CD) devices, and/or hard disks (none of which are explicitly shown in FIG. 1).

In some embodiments, the database 150 may store information associated with the portable wagering medium 130. The database 150 may store (e.g., in one or more database records related to the portable wagering medium 130), for example, an identifier for the portable wagering medium 130 and/or an indication of a status of the portable wagering medium 130. While the database 150 is depicted in FIG. 1 as being separate from the wagering game device 110, the portable wagering medium 130, and the controller 160, in some embodiments the database 150 may be coupled to and/or reside within any or all of the wagering game device 110, the portable wagering medium 130, and the controller 160. The database 150 may comprise, for example, a memory device housed within the portable wagering medium 130, a memory device of the wagering game device 110, and/or a memory device of the controller 160.

The controller 160 may generally comprise any type or configuration of processing device, controller, server, and/or other computing device that is operable to interface with one or more of the wagering game device 110 and/or the database 150 (and/or the portable wagering medium 130). The controller 160 may, for example, manage, conduct, and/or facilitate the downloading and/or execution of downloadable games playable on one or more wagering game devices 110 (e.g., the controller 160 may comprise a central controller of a server-based gaming environment). According to some embodiments, the controller 160 may also or alternatively be operable to configure a wagering game device 110 (and/or another device, such as a kiosk, Point-Of-Sale (POS) terminal, etc.) remotely, update software stored on the wagering game device 110 and/or to download software or software components to the wagering game device 110. For example, the controller 160 may be operable to apply a hot fix to software stored on a wagering game device 110, modify a payout and/or probability table stored on a wagering game device 110 and/or transmit a new version of software and/or a software component to a wagering game device 110. The controller 160 may be programmed to perform any or all of the above functions based on, for example, an occurrence of an event (e.g., a scheduled event), receiving an indication from a qualified casino employee and/or other person (e.g., a regulator) and/or receiving a request from a player (e.g., the player 170).

The controller 160 may comprise, in some embodiments, an electronic device (e.g., a computer) that is operable to communicate with one or more wagering game devices 110. In some embodiments, the controller 160 may function as a computer server and may control or direct at least some processes of wagering game devices 110. Alternately or additionally, the controller 160 may contain or otherwise be configured to read data from and/or write data to one or more databases, such as the database 150. Such data may comprise, for example, probability data, payout data, player data, data associated with and/or descriptive of the portable wagering medium 130, and so on. In some embodiments, outcomes may be "centrally-determined" by the controller 160 and/or by another device that is distinct from the wagering game device 110. Such centrally-determined outcomes may then be promulgated to one or more wagering game devices 110, such that they may be received by the player 170.

In some embodiments, the controller 160 may also or alternatively be in communication with another electronic device (not shown) that is distinct from a wagering game device 110, which electronic device may be operable to, for example, (i) direct the controller 160 to perform certain functions and/or (ii) read data from and/or write data to the central controller 160. For example, the controller 160 may comprise a slot server or Data Collection Unit (DCU) that controls and/or communicates with a bank of wagering game devices 110, which server or DCU is in turn in communication with a casino server that is in communication with a plurality of controllers. In some embodiments, the controller 160 may be operable to communicate with the one or more wagering game devices 110 via another electronic device (e.g., a DCU), such as a server computer operable to communicate with a plurality of wagering game devices 110. For example, in some embodiments, the controller 160 may be operable to communicate with a plurality of computing devices (not shown), each computing device operable to communicate with a respective plurality of wagering game devices 110. According to some embodiments, the controller 160 may not be incorporated into the system 100. In the case that the wagering game device 110 is in direct communication with the database 150, for example, the wagering game device 110 may not require the controller 160 to perform, facilitate, and/or execute the methods and procedures described herein.

Figure 2:
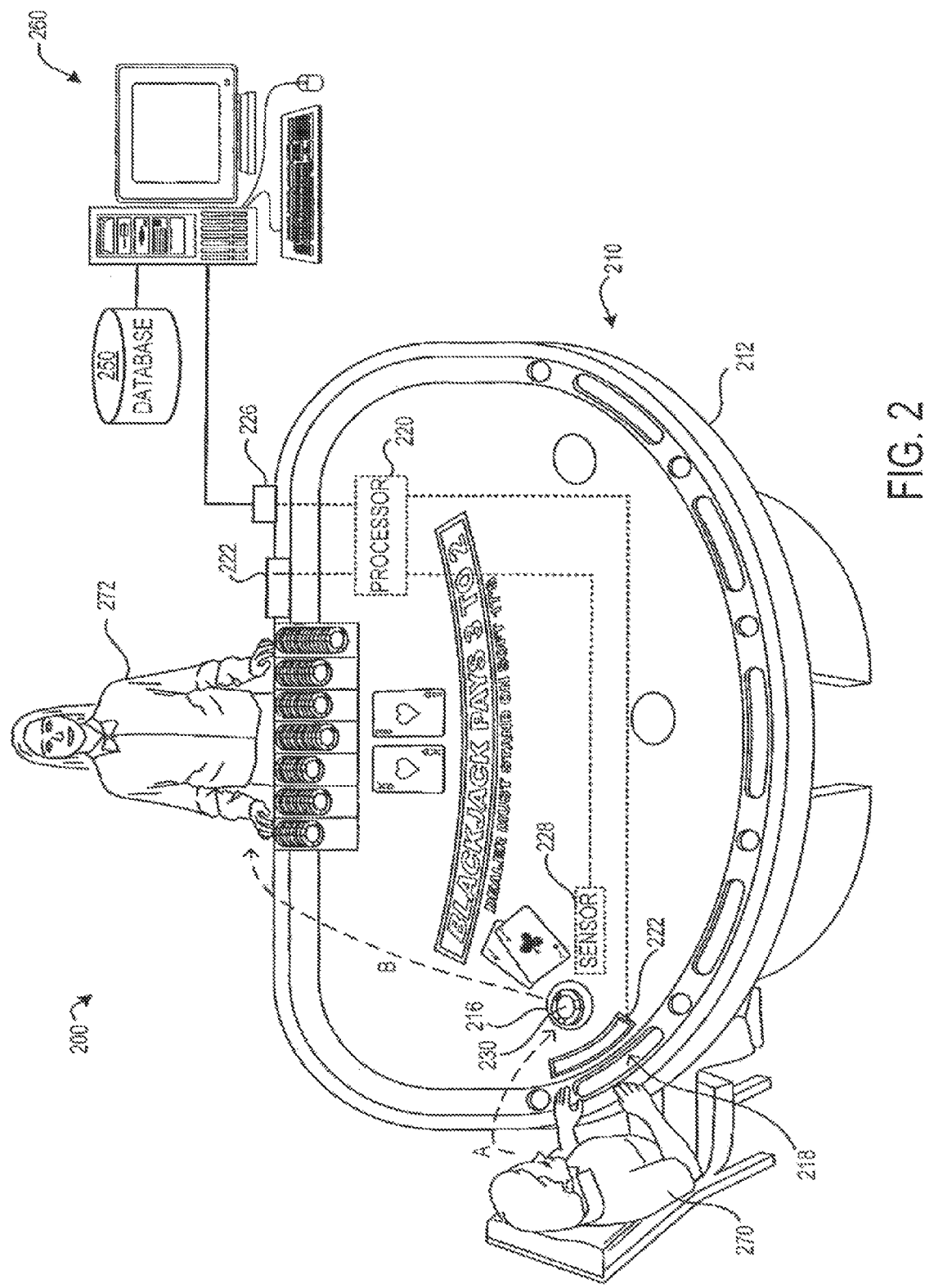
FIG. 2 is a perspective diagram of a system according to some embodiments.

Turning now to FIG. 2, a perspective diagram of a system 200 according to some embodiments is shown. In some embodiments, the system 200 may be similar in configuration and/or functionality to the system 100 of FIG. 1. The system 200 may comprise, for example, a wagering game device 210 in communication with a portable wagering medium 230, a database 250, and/or a controller 260. In some embodiments, the portable wagering medium 230 may be owned, possessed, and/or otherwise associated with a player 270, and/or the wagering game device 210 may be operated, serviced, and/or monitored by a casino employee such as a dealer 272 (e.g., the dealer 272 that facilitates and/or conducts a wagering game at the wagering game device 210). According to some embodiments, the components 210, 230, 250, 260 of the system 200 may be similar in configuration and/or functionality to the similarly named and/or numbered components described in reference to FIG. 1 herein. The system 200 may be generally configured, for example, to perform and/or facilitate processes and/or methods in accordance with embodiments described herein. In some embodiments, the system 200 may be configured to determine a status of the portable wagering medium 230 and/or cause the portable wagering medium 230 to output an indication of the status (e.g., by outputting the indication to the player 270 and/or the dealer 272).

As shown in FIG. 2, for example, the player 270 may be seated at the wagering game device 210, which is depicted as comprising a standard Blackjack table 212. The Blackjack table 212 may generally comprise a playing surface 214 (or "felt") with one or more designated betting areas 216 (e.g., a "betting circle", as shown) and/or one or more chip trays 218. The player 270 may place a bet by, for example, placing the portable wagering medium 230, which is depicted as a wagering chip in FIG. 2, on the playing surface 214 of the Blackjack table 212 (and/or a specific portion thereof, such as within the betting area 216). In some embodiments, the placing of the bet or wager may be initiated by a removal of the portable wagering medium 230 from the chip tray 218, such as is depicted by the dashed line labeled "A". FIG. 2 illustrates exemplary final Blackjack hands dealt to the player 270 and to the dealer 272 in a single round of game play. As shown, the dealer 272 has won the hand (e.g., by obtaining a higher scored and/or valued outcome than the player 270; i.e., an eighteen (18) beats a seventeen (17)), and the wagering chip 230 is therefore forfeited to the dealer 272 (e.g., as depicted by the dashed line labeled "B").

In some embodiments, the Blackjack table 212 may be electronically facilitated and/or the wagering game device 210 may comprise a "smart" table, as shown in FIG. 2. The wagering game device 210 may comprise, for example, a processor 220 in communication with an input device 222, an output device 224, a communication device 226, and/or a sensor 228. The input device 222 may comprise, for example, an interface via which the dealer 272 may interact with the wagering game device 210, such as one or more buttons and/or a touch screen interface. The output device 224 may, according to some embodiments, comprise a display device (as shown in FIG. 2) that is situated to display information to the player 270 (and/or dealer 272). The communication device 226 may generally comprise a wired and/or wireless transceiver, modem, cable, and/or port, for example, that is operable to send and receive signals to and from the controller 260 (and/or the database 250). The sensor 228 may, in some embodiments, comprise one or more receivers, transponders, interrogators, and/or other sensors or input devices operable to determine an identity and/or presence or location of the wagering chip 230. The sensor 228 may detect the wagering chip 230 utilizing RFID technology, for example, and the wagering game device 210 and/or the dealer 272 may determine that the wagering chip 230 has been utilized to place a wager associated with the losing outcome shown in FIG. 2. While the sensor 228 is shown as being located proximate to the betting area 216 of the Blackjack table 212 (e.g., to detect wagering chips 230 placed within the betting area 216), the sensor 228 may be located in any other fashion, orientation, and/or position that is or becomes practicable. The sensor 228 may, for example, also or alternatively be located proximate to and/or within the chip tray 218 (e.g., to detect wagering chips 230 placed in the chip tray 218—such as by the player 270).

According to some embodiments, the dealer 272 may utilize the input device 222 (e.g., press a button corresponding to the losing player 270 or hand) to signal that any wagering chips 230 associated with the bet placed by the player 270 have been "lost". In some embodiments, such a determination may be made by the wagering game device 210 (and/or by the processor 220 thereof) and/or a separate wagering game device 210 (not explicitly shown in FIG. 2), such as in the case that the wagering game device 210 and/or other device is operable to read the cards dealt to the player 270 and the dealer 272 and/or otherwise is operable to determine the outcome of the game. According to some embodiments, upon determining that the wagering chip 230 has been "lost" by the player 270, the wagering game device 210 (and/or other device) may cause the wagering chip 230 to output an indication of the determination. A signal may be transmitted to the wagering chip 230 (e.g., via the communication device 226), for example, causing the wagering chip 230 to display the words "LOSS" (e.g., to indicate that the wagering chip 230 has been "lost"), "RED" (e.g., to indicate a color associated with the loss), and/or "DEALER" (e.g., to indicate an appropriate new "owner" of the wagering chip 230). Similar indications may also or alternatively be provided to the player 270 via the display device 224. The wagering chip 230 may also or alternatively output an indication of the "loss" status of the wagering chip 230 by flashing, glowing, blinking, vibrating, and/or producing sound (e.g., by playing recorded or synthesized voice, beeps, and/or music or "ring tones"—such as a rendition of the "Imperial March (Darth Vader's Theme)" from the "Star Wars" movies).

In such a manner, for example, the dealer 272 (and/or the player 270) may be made aware that the wagering chip 230 should be collected by the dealer 272. Particularly in the case where many players 270 utilizing many wagering chips 230 are participating in the wagering game at the wagering game device 210 (e.g., playing Blackjack at the Blackjack table 212), outputting of the indication of the "loss" status of the wagering chip 230 may advantageously facilitate proper and efficient collection of wagering chips 230 by the dealer 272 (e.g., to decrease the amount of time between rounds of game play and/or to help avoid mistakes—such as the wrong wagering chips 230 being collected or such as a wagering chip 230 that is supposed to be forfeited, not being collected).

According to some embodiments, the controller 260 and/or the database 250 may also or alternatively be utilized to determine the status of the wagering chip 230 and/or cause the wagering chip 230 to output the indication of the status. In the case that the face value of the wagering chip 230 varies (e.g., depending upon where in a casino or property it is located, depending upon the purpose or manner in which it is used, and/or depending upon different events), for example, the wagering game device 210 may query and/or access the database 250 (e.g., via the communication device 226 and/or via the controller 260) to determine a current and/or applicable face value of the wagering chip 230. The wagering chip 230 may then be sent a signal (e.g., via the communication device 226), for example, to cause the wagering chip 230 to display an indication of the appropriate face value. In some embodiments, the indication of the face value (and/or other information as described herein) may also or alternatively be provided to the player 270 via the display device 224. As described herein, the wagering game device 210 may also or alternatively comprise a predominately electronic device such as a slot machine or other video machine. In some embodiments, for example, the dealer 272 may not necessarily be included in the system 200 (and/or the dealer 272 may comprise an Artificial Intelligence (AI) and/or rendition thereof).

Figure 3:
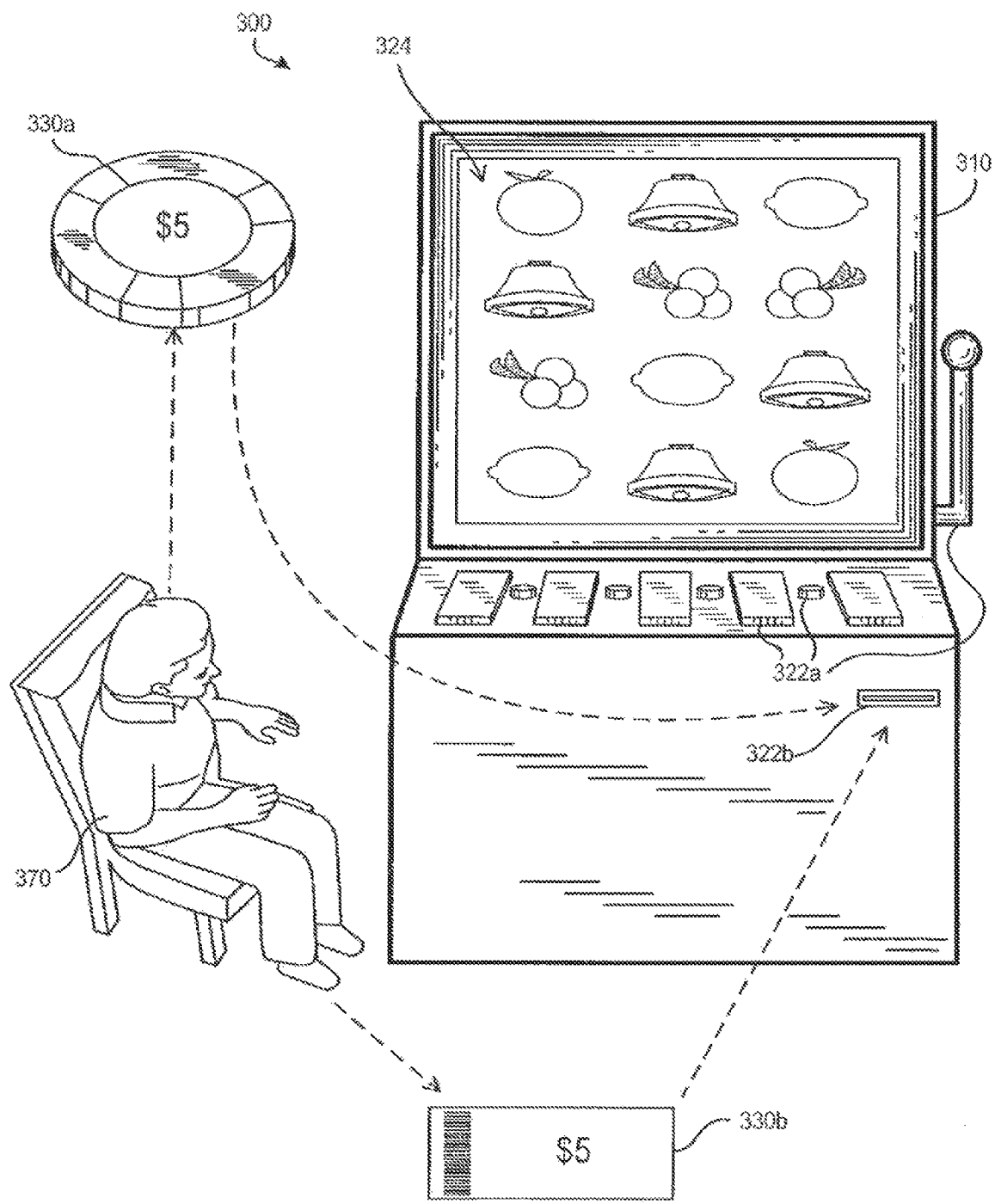
FIG. 3 is a perspective diagram of a system according to some embodiments.

Referring to FIG. 3, for example, a perspective diagram of a system 300 according to some embodiments is shown. In some embodiments, the system 300 may be similar in configuration and/or functionality to the system 100 of FIG. 1 and/or the system 200 of FIG. 2. The system 300 may comprise, for example, one or more wagering game devices 310. In some embodiments, the wagering game device 310 may comprise one or more primary input devices 322a, one or more secondary input devices 322b, and/or one or more output devices 324. According to some embodiments, the wagering game device 310 may be in communication with one or more portable wagering mediums 330a-b. As shown in FIG. 3, the portable wagering medium 330a-b may comprise a first portable wagering medium 330a, such as a wagering chip or token, and/or a second portable wagering medium 330b, such as a cashless gaming ticket. In some embodiments, the portable wagering medium 330a-b may be owned, possessed, and/or otherwise associated with a player 370.

According to some embodiments, the components 310, 322, 324, 330, 370 of the system 300 may be similar in configuration and/or functionality to the similarly named and/or numbered components described in reference to FIG. 1 and/or FIG. 2 herein. The system 300 may be generally configured, for example, to perform and/or facilitate processes and/or methods in accordance with embodiments described herein. In some embodiments, the system 300 may be configured to determine a status of the portable wagering medium 330a-b and cause the portable wagering medium 330a-b to output an indication of the status (e.g., by outputting the indication to the player 370).

As shown in FIG. 3, the wagering game device 310 may comprise a typical gambling device that is utilized to conduct a game of chance, such as a slot machine, video poker machine, etc. In such embodiments, the primary input device(s) 322a may comprise one or more buttons such as one or more "Max Bet", "Spin", "Hold", and/or "Deal" buttons and/or a pull-arm or other actuator, and the secondary input device 322b may comprise a coin acceptor and/or coin mechanism operable to accept insertion of the first portable wagering medium 330a (e.g., a wagering chip or token). The secondary input device 322b may also or alternatively comprise a Ticket-In-Ticket-Out (TITO) and/or other cashless gaming device or mechanism that is operable to accept the second portable wagering medium 322b (e.g., a cashless gaming ticket, voucher, and/or receipt).

According to some embodiments, the wagering game device 310 may determine a status of the portable wagering medium 330a-b. This may occur when the portable wagering medium 330a-b is located in proximity to the wagering game device 310 and/or upon insertion of the portable wagering medium 330a-b into the wagering game device 310 (and/or the secondary input device 322b thereof). The wagering game device 310 may detect, for example, a presence of the portable wagering medium 330a-b near the wagering game device 310 (e.g., the player 370 may bring the portable wagering medium 330a-b to the wagering game device 310 and/or may pass by the wagering game device 310 with the portable wagering medium 330a-b). The wagering game device 310 may then determine (e.g., by querying a database—not shown; such as the database 150, 250 of FIG. 1 and/or FIG. 2), for example, that the portable wagering medium 330a-b qualifies for a particular discount or prize, and may transmit a signal to the portable wagering medium 330a-b to cause the portable wagering medium to output an indication of the discount or prize. In some embodiments, the discount or prize may be specifically associated with the wagering game device 310 and/or other related wagering game devices 310. A player 370 walking near a specific bank of wagering game devices 310 (such as a specific bank or group of slot machines, for example) may be notified by the portable wagering medium 330a-b, for example, that the portable wagering medium 330a-b is worth an additional five dollars ($5) over face value if utilized to place a wager in the specific nearby bank of wagering game device 310.

Similarly, the wagering game device 310 may determine that the portable wagering medium 330a-b has previously been utilized to place a wager in the wagering game device 310 and/or is otherwise associated with the wagering game device 310 (e.g., has been cashed out of a related wagering game device 310 in a network). The player 370 may carry the portable wagering medium 330a-b around the floor of the casino, for example, and choose a wagering game device 310 based on whether the portable wagering medium 330a-b provides an indication that it is somehow related to the specific wagering game device 310. Players 370 may utilize such a method, for example, in an attempt to find "lucky" machines. In some embodiments, the indications from the portable wagering medium 330a-b may be the only way to determine if and/or how certain wagering game devices 310 are related. These embodiments are, of course, at least equally applicable to the case where the wagering game device 310 comprises a table game in the casino.

C. Wagering Game Device

Figure 4:
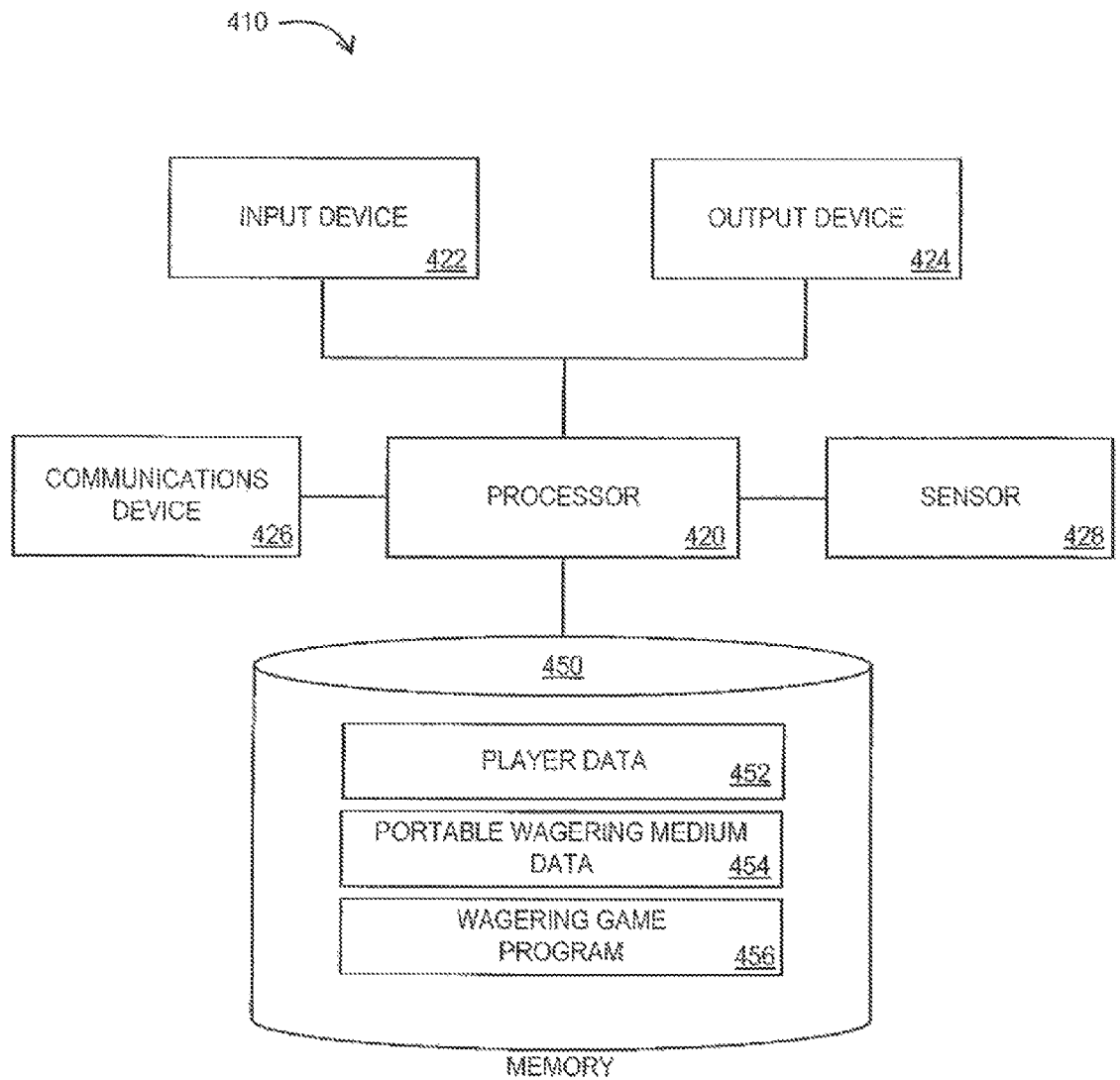
FIG. 4 is a block diagram of a wagering game device according to some embodiments.

Turning now to FIG. 4, a block diagram of a wagering game device 410 according to some embodiments is shown. In some embodiments, the wagering game device 410 may be similar in configuration and/or functionality to any of the wagering game devices 110, 210, 310 described in relation to FIG. 1, FIG. 2, and/or FIG. 3 herein. The wagering game device 410 may comprise, for example, a processor 420, an input device 422, an output device 424, a communications device 426, a sensor 428, and/or a memory 450 storing one or more of (i) player data 452, (ii) portable wagering medium data 454, and/or (iii) a wagering game program 456. According to some embodiments, the wagering game device 410 may be configured to perform and/or facilitate processes in accordance with embodiments described herein. The wagering game device 410 may, for example, be utilized to determine a status of a portable wagering medium (e.g., any of the portable wagering mediums 130, 230, 330a-b described in relation to FIG. 1, FIG. 2, and/or FIG. 3 herein) and/or to cause the portable wagering medium to output an indication of the status.

According to some embodiments, the processor 420 may be or include any type, quantity, and/or configuration of processor that is or becomes known. The processor 420 may comprise, for example, an Intel® IXP 2800 network processor or an Intel® XEON™ Processor coupled with an Intel®

E7501 chipset. In some embodiments, the processor 420 may comprise multiple inter-connected processors, microprocessors, and/or micro-engines. According to some embodiments, the processor 420 (and/or the wagering game device 410 and/or other components thereof) may be supplied power via a power supply (not shown). According to some embodiments, the processor 420 may receive signals from and/or send signals to any or all of the input device 422, the output device 424, the communications device 426, the sensor 428, and/or the memory 450.

In some embodiments, the wagering game device 410 may comprise the input device 422. The input device 422 may be or include any type, quantity, and/or configuration of input device that is or becomes known or practicable. The input device 422 may comprise, for example, a keyboard, a keypad, a pointing device (such as a mouse or trackball), one or more buttons or switches, a biometric device, such as a fingerprint or retinal scanner, a magnetic card reader or smart card reader, and/or one or more softkeys and/or variable function input devices. According to some embodiments, such as in the case that the wagering game device 410 comprises a "smart" table game and/or electronic wagering game such as a slot machine, the input device 420 may be utilized by a player (such as the player 170, 270, 370 of FIG. 1, FIG. 2, and/or FIG. 3) to place a wager in a wagering game and/or may be utilized by a dealer (such as the dealer 272 of FIG. 2) to facilitate execution and/or monitoring of the wagering game. A dealer may interface with the input device 422, for example, to indicate an outcome of a round of play at a table game in a casino. The input device 422 may then provide an indication of such input to the processor 420.

In some embodiments, the wagering game device 410 may also or alternatively comprise the output device 424. The output device 424 may, for example, be or include any type of output device that is or becomes known or practicable. Examples of output devices 424 may include, but are not limited to, a printer, a speaker, a modem, a Network Interface Card (NIC), a port, a path, a cable, a CRT display device, a LCD device, and/or an LED display device. According to some embodiments, information associated with any of the processor 420, the sensor 428, the communication device 426, and/or the input device 420 may be provided, transmitted, and/or displayed via the output device 424. The output device 424 may, for example, comprise a display screen to provide various information to a player of a wagering game associated with the wagering game device 410. In some embodiments, the output device 424 may be utilized to provide information processed by the processor 420 and/or information stored via the memory 450.

According to some embodiments, the wagering game device 410 may comprise the communications device 426. As described herein, the communications device 426 may comprise any type or configuration of communications device that is or becomes known or practicable. The communications device 426 may comprise, for example, a network connection, port, adapter, card, and/or path that facilitates communications between the wagering game device 410 and one or more other devices (such as a portable wagering medium 130, 230, 330 of FIG. 1, FIG. 2, and/or FIG. 3 herein, and/or such as a controller 160, 260 of FIG. 1 and/or FIG. 2 herein). In some embodiments, the communications device 426 may comprise multiple devices such as a wireless communications device operable to send signals to and/or receive signals from a portable wagering medium and/or player device and/or a hard-wired network connection (e.g., via a NIC) that couples the wagering game device 410 to a casino network (such as a server-based gaming network).

In some embodiments, the wagering game device 410 may also or alternatively comprise the sensor 428. The sensor 428 may generally comprise any type or configuration of data acquisition and/or sensing device that is or becomes known or practicable. The sensor 428 may, for example, comprise one or more sensing devices configured and/or coupled to identify, detect, and/or otherwise determine information associated with a portable wagering medium. The sensor 428 may, for example, comprise an RFID transponder and/or inductive coil operable to detect a presence of a portable wagering medium in proximity to the wagering game device 410. According to some embodiments, the sensor 428 may comprise various components that are not explicitly shown in FIG. 4 and that may vary depending upon the specific type of sensing device that is utilized. In the case that the sensor 428 comprises an RFID reader, for example, the sensor 428 may also comprise an antennae loop or circuit and/or a power source, both for facilitating generation of an RF interrogation field, and/or a microcontroller (e.g., to demodulate and/or decrypt or decode detected information or signals).

In some embodiments, the sensor 428 may be operable to determine data stored in the portable wagering medium. The sensor 428 may, for example, be operable to read an identifier from the portable wagering medium. According to some embodiments, this identifier may be provided to the processor 420, which may then access the portable wagering medium data 454, for example, to look up information stored in association with the portable wagering medium.

Any type, quantity, and/or configuration of sensor 428 that is operable to identify, detect, and/or otherwise determine information associated with a portable wagering medium may be utilized. In some embodiments, the sensor 428 may also or alternatively be operable to detect other information such as information relating to an outcome of a wagering game conducted by the wagering game device 410, information associated with a player (e.g., player tracking information), and/or information associated environmental conditions (e.g., temperature, barometric pressure, humidity, noise levels, smoke levels, and/or other conditions that may affect and/or influence a player's mood, perception, and/or conduct in a wagering game). The sensor 428 may comprise, for example, electrical, electronic, magnetic, and/or mercury switches, pressure sensors, stress sensors, motion sensors, weight sensors, light sensors (including lasers), thermal sensors, acoustic sensors, triggers, gates, switches, barcode or other electronic readers and/or scanners, signal receivers, and/or any other type of sensing device that is or becomes practicable.

In the case that RFID technology is utilized to facilitate detection and/or identification of a portable wagering medium, the sensor 428 may comprise, for example, a SkyeModule™ M1-mini High Frequency (HF) reader (which operates at a frequency of 13.56 MHz and has an effective reading range of between 5.8 and 8.5 centimeters) and/or a SkyeModule™ M9 Ultra-High Frequency (UHF) reader (which operates at a frequency of between 862 and 955 MHz and has an effective reading range of between about 1 and 3.5 meters), both manufactured by SkyeTek, Inc., of Westminster, Colo. In the case that other inductive and/or proximity detection technology is utilized to implement the sensor 428, the sensor 428 may comprise, for example, a proximity card reader and/or "LC Circuit" that operates in accordance with the "Identification Cards—contactless integrated circuit(s) cards—Proximity cards" standard number 14443-1 published by the International Organization for Standardization (ISO) on Apr. 15, 2000, and/or a vicinity card reader that operated in accordance with the "Identification Cards—contactless integrated circuit(s) cards—Vicinity cards" standard number 15693-1 published by the ISO on Jul. 15, 2000.

The memory 450 may, according to some embodiments, store the player data 452, the portable wagering medium data 454, and/or the wagering game program 456, any or all of which may be utilized by the processor 420 to provide output information via the output device 424 (and/or via the communications device 426). The memory 450 may generally comprise any appropriate information storage device that is or becomes known or available, including, but not limited to, units and/or combinations of magnetic storage devices (e.g., a hard disk drive), optical storage devices, and/or semiconductor memory devices. In some embodiments the memory 450 may reside within and/or be otherwise physically coupled to the wagering game device 410 (e.g., as depicted in FIG. 4). According to some embodiments, the memory 450 may be in communication with the wagering game device 410, such as via the communications device 426, yet may be remote from and/or otherwise not directly coupled to the wagering game device 410 (e.g., the memory 450 may be coupled to a portable wagering medium and/or controller such as the portable wagering mediums 130, 230, 330 of FIG. 1, FIG. 2, and/or FIG. 3 herein and/or such as the controller 160, 260 of FIG. 1 and/or FIG. 2 herein). The memory 450 may, for example, simply be accessible to the wagering game device 410 (e.g., externally located and/or situated). In some embodiments, the memory 450 may be similar in configuration and/or functionality to the databases 150, 250 of FIG. 1 and/or FIG. 2 herein.

The memory 450 may generally store the player data 452, the portable wagering medium data 454, and/or the wagering game program 456. Any or all of these and other types of data may be stored in any number, type, and/or configuration of data storage structures (such as the data storage structures described elsewhere herein) that are or become known or practicable. The memory 450 may, for example, comprise one or more data tables or files, databases, table spaces, registers, and/or other storage structures. In some embodiments, multiple databases and/or storage structures (and/or multiple data storage devices) may be utilized to store information associated with the wagering game device 410, a player, a wagering game, and/or one or more portable wagering mediums.

The player data 452 may generally comprise data associated with players, such as players at a casino and/or players that are otherwise participating in a wagering game (e.g., online). In some embodiments, the player data 452 may store information such as player tracking information, comp points, and/or a listing or indication of which portable wagering mediums have been purchased, won, and/or lost by the player. The portable wagering medium data 454 may generally comprise data associated with a portable wagering medium and/or a use of the portable wagering medium to place a wager in a wagering game. The portable wagering medium data 454 may, for example, be detected, identified, and/or determined by the sensor 428. The portable wagering medium data 454 may be utilized, in accordance with some embodiments, by the processor 420 to determine a status of a portable wagering medium (e.g., by storing status determination rules and/or by storing an indication of the status itself) detected and/or identified by the sensor 428. The processor 420 may then, for example, send a signal to the portable wagering medium via the communication device 426 to cause the portable wagering medium to output an indication of the determined status.

In some embodiments, the memory 450 may also or alternatively store the wagering game program 456. The wagering game program 456 may generally be operable to cause the processor 420 to execute and/or otherwise process data in accordance with one or more wagering games. Upon the detection of an event (e.g., via the sensor 428), for example, the processor 420 may execute the wagering game program 456 to provide game-related data to a player (e.g., via the output device 424). According to some embodiments, the wagering game program 456 may include complete code capable of, executing, performing, and/or rendering an entire game. In some embodiments, the wagering game program 456 may simply comprise instructions associated with game output (e.g., moves, actions, and/or coordinates) and/or game results (e.g., win, doss, and/or other particular outcomes). According to some embodiments, the wagering game program 456 may also or alternatively be stored or at least partially stored in a separate device such as a server-based gaming server (e.g., the controller 160, 260 of FIG. 1 and/or FIG. 2).

D. Portable Wagering Medium

Figure 5:
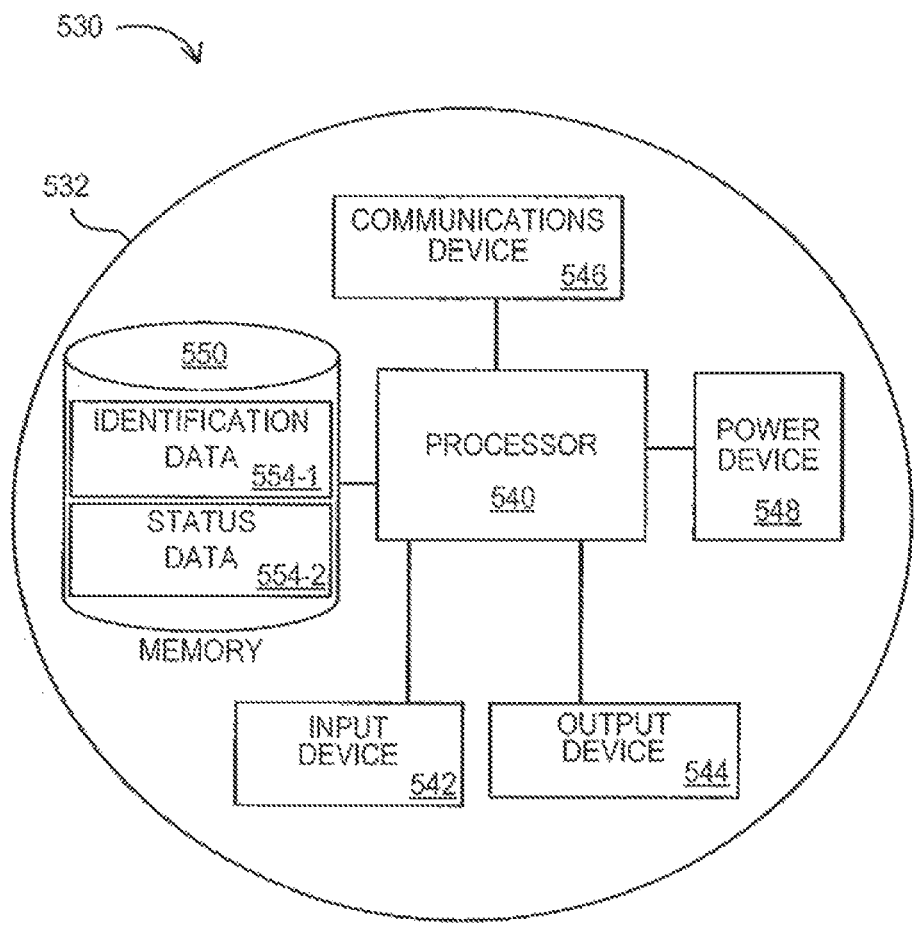
FIG. 5 is a block diagram of a portable wagering medium according to some embodiments.

Turning to FIG. 5, a block diagram of a portable wagering medium 530 according to some embodiments is shown. In some embodiments, the portable wagering medium 530 may be similar in configuration and/or functionality to any of the portable wagering mediums 130, 230, 330 of FIG. 1, FIG. 2, and/or FIG. 3 herein. The portable wagering medium 530 may comprise, for example, a casing 532, a processor 540, an input device 542, an output device 544, a communications device 546, a power device 548, and/or a memory 550. In some embodiments, the memory 550 may store one or more of identification data 552 and/or status data 554.

According to some embodiments, the components 532, 540, 542, 544, 546, 548, 550 of the portable wagering medium 530 may be similar in configuration and/or functionality to the similarly named and/or numbered components described in reference to any of FIG. 1, FIG. 2, FIG. 3, and/or FIG. 4 herein. The portable wagering medium 530 may be generally configured, for example, to receive an indication of a status of the portable wagering medium 530 and output (e.g., in response to the receiving) an indication of the status. In such a manner, for example, a player and/or dealer of a wagering game may be provided with pertinent information and/or may be provided the information in a manner that facilitates enjoyment and/or efficient execution of the wagering game. Such functionality may also or alternatively facilitate execution of one or more secondary games utilizing the portable wagering medium 530.

In some embodiments (such as shown in FIG. 5), the casing 532 of the portable wagering medium 530 may be substantially circularly shaped and/or may substantially house or enclose any or all of the components 540, 542, 544, 546, 548, 550 of the portable wagering medium 530. The casing 532 may, for example, comprise a casing or housing similar in shape, composition, and/or functionality to that of a typical wagering chip. As described herein, the casing 532 may also or alternatively be otherwise shaped or structured as is or becomes desirable. While circular and/or coin-shaped portable wagering mediums 530 may be advantageous due to their ease of acceptance into coin operation mechanisms and/or due to player familiarity with or preference for round objects, for example, the casing 532 may, according to some embodiments, be structured as a square or rectangular wagering plaque, a cashless gaming ticket, etc.

The casing 532 may generally be constructed from any number or combination of suitable materials such as clay, plastic (e.g., Acrylonitrile Butadiene Styrene (ABS) plastic), polymer, acrylic, metal, ceramic, and/or composite materials. The casing 532 may generally be constructed in any fashion that is or becomes known or practicable, including compression molding, injection molding, stamping, forging, casting, laminating, and/or die cutting. The casing 532 may be injection molded from a particulate filled thermoset plastic surrounding a metal core ("metal core chips"), for example, or may be injection molded from a synthetic polymer acrylic composite with a laminated center portion (with or without a metal core or inset). The portable wagering medium 530 may, according to some embodiments, typically be constructed to have a mass of between about eight and eleven and one half grams (8-11.5 g) and/or the portable wagering medium 530 (and/or the casing 532 thereof) may typically be constructed to have a standard diameter of approximately one and fifty-four hundredths of an inch (1.54-inches/39-mm). In some embodiments, such as in the case that the portable wagering medium 530 comprises a cashless gaming ticket, the casing 532 may simply comprise a substrate and/or other medium upon which various components and/or features are printed, embedded, and/or otherwise physically coupled.

According to some embodiments, the portable wagering medium 530 may comprise the processor 540, the input device 542, the output device 544, and/or the communications device 546. Any or all of these components 540, 542, 544, 546 may comprise any type or configuration of appropriate devices that are or become known or practicable. Such components 540, 542, 544, 546 may, for example, comprise one or more devices that are similar to the other similarly-named and/or numbered components described herein. In some embodiments, such as in the case that the portable wagering medium 530 comprises a wagering chip, the input device 542 may comprise a button that is coupled to be actuated by a player or dealer to provide input to the processor 540. The output device 544 may comprise, according to some embodiments, a display device, a sound emitting device (e.g., a speaker), and/or any other type of output device (e.g., a transmitter or an olfactory emitter). The output device 544 may comprise, for example, one or more LED, LCD, incandescent, Electroluminescent Panel (ELP), plasma, and/or Cold Cathode Fluorescent Lamp (CCFL) display devices coupled to provide visual indications of statuses of the portable wagering medium 530, and/or may comprise a speaker operable to emit beeps and/or play tones, tunes, and/or songs (e.g., to indicate various statuses of the portable wagering medium 530).

In some embodiments, the communications device 546 may comprise any device that is operable to at least receive indications relating to a status of the portable wagering medium 530. The communications device 546 may comprise, for example, a receiver and/or antennae loop or circuit operable to receive status indications and/or updates from a separate device such as any of the wagering game devices 110, 210, 310, 410 of FIG. 1, FIG. 2, FIG. 3, and/or FIG. 4 herein. Such indications and/or signals may be passed by the communications device 546 to the processor 540. The processor 540 may utilize such information to update the memory 550, for example, and/or to cause the output device 544 to provide certain indications of the status (or to cause the output device 544 to cease outputting, as the case may be).

According to some embodiments, the portable wagering medium 530 may also or alternatively comprise the power device 548. The power device 548 may generally comprise any type or configuration of device that is operable to provide power to one or more of the processor 540, the input device 542, the output device 544, the communications device 546, and/or the memory 550, which is or becomes known or practicable. The power device 548 may comprise, for example, a battery, an Alternating Current (AC) source and/or component, a Direct Current (DC) source and/or component, an AC/DC adapter, solar cells, an inductive coil, a capacitor, and/or an inertial generator. A Lithium-ion (Li-ion), Nickel Cadmium (NiCad), and/or Nickel Metal Hydride (NiMH) battery may, for example, supply the necessary voltage and/or amperage to power any or all of the components 540, 542, 544, 546, 550 of the portable wagering medium 530.

The memory 550 may be similar in configuration and/or functionality to the other memory devices 150, 250, 450 of FIG. 1, FIG. 2, and/or FIG. 4 herein. The memory 550 may store, according to some embodiments, the identification data 552 and/or the status data 554. The memory 550 may comprise, for example, any appropriate combination of magnetic, optical and/or semiconductor memory, including, but not limited to one of, or any combination of: (i) RAM; (ii) Dynamic RAM (DRAM); (iii) embedded DRAM (eDRAM); (iv) Static RAM (SRAM); (v) ferroelectric RAM (FeRAM); (vi) magneto-resistive RAM (MRAM); (vii) phase-change RAM (PRAM); (viii) resistive RAM (RRAM); (ix) Nano-RAM (NRAM); (x) zero-capacitor RAM (Z-RAM); (xi) twin-transistor RAM (TTRAM); (xii) Read-Only Memory (ROM); (xiii) programmable ROM (PROM) or field-programmable ROM (FPROM); (xiv) electrically erasable PROM (EEPROM); (xv) flash memory; and/or (xvi) Semiconductor-Oxide-Nitride-Oxide-Semiconductor (SONOS). The memory 550 may, according to some embodiments, comprise and/or comprise a portion of an RFID tag (e.g., that is operable to be read and/or interrogated by an RFID reader). In some embodiments, such as in the case that a plurality of portable wagering mediums 530 may be desirable to interrogate within a single RF field, the memory 550 may comprise anti-collision features that prevent collisions of data between the various other portable wagering mediums 530 and the RFID reader. The memory 550 may comprise, for example, an MCRF250 125 kHz microID® Passive RFID Device with Anti-Collision, manufactured by Microchip™ Technology Inc., of Chandler, Ariz.

The identification data 522 may generally comprise an indication of an identifier, such as a unique identifier, associated with the portable wagering medium 530. The identification data 522 may comprise, for example, a name, number, alphanumeric designator, serial number, code, a matrix, and/or any other sequence or identifier that is operable to facilitate identification of the portable wagering medium 530. In some embodiments, the identification data 522 may also or alternatively comprise an indication of a specific group or class to which the portable wagering medium 530 belongs. According to some embodiments, an indication of a group or class may comprise the only identification data 522. It may be desirable for a casino, for example, to change or update the statuses of a certain group or class of wagering chips 530 throughout the casino. All one hundred dollar ($100) chips 530 in the casino may be temporarily upgraded with a twenty dollar ($20) bonus amount over the face value, for example, such as to promote the purchase of high-value wagering chips 530. Similarly, a group of chips 530 may comprise a full set or subset of wagering chips 530 possessed by a particular player or group of players, for example, and the particular player of group of players may therefore have all of their wagering chips 530 upgraded and/or entered into secondary game play, in accordance with some embodiments.

In some embodiments, the identification data 552 may not be stored by the memory 550. The identification data 552 may, for example, be physically and/or otherwise indicated on or within the portable wagering medium 530 (and/or the casing 532 thereof). The identification data 552 may, according to some embodiments, be printed, embossed, engraved, etched, and/or otherwise physically, human readably, and/or machine readably indicated by the portable wagering medium 530 and/or the casing 532. Various graphics, patterns, watermarks, etchings, inscriptions, chemical deposits, and/or other features of the portable wagering medium 530 may, for example, indicate an identity of the portable wagering medium 530, without requiring and/or utilizing the memory 550.

The status data 544 may generally comprise one or more indications of one or more statuses of the portable wagering medium 530. The status data 544 may comprise, for example, a word (e.g., "WIN!"), phrase (e.g., "Odds=20:1"), color (e.g., red may be associated with a particular player or a portable wagering medium 530 that has been utilized to place a losing bet), number (e.g., a face value and/or bonus or discount value), a code (e.g., that represents a particular status), and/or any other indication descriptive of a status (current and/or previous) of the portable wagering medium 530. In some embodiments, the status data 544 may also or alternatively comprise data regarding whether the output device 544 is currently outputting an indication of a status, which status the output device 544 may be currently outputting an indication of, and/or whether the output device 544 is operational (e.g., a zero (0) representing an "off" status, a one (1) representing an "on" status, and/or error codes). In some embodiments, the status data 554 may not be stored in the memory 550 and/or may not be stored by the portable wagering medium 530.

In some embodiments, the portable wagering medium 530 may not comprise the processor 540, the input device 542, and/or the memory 550. In a simplistic form, for example, the portable wagering medium 530 may comprise the casing 532 housing and/or otherwise coupling to the communications device 546 (e.g., an antennae), which itself would be at least communicatively coupled to the output device 544 (e.g., a display device). The communications device 546 may receive an indication of a status of the portable wagering medium 530 and provide the indication to the output device 544, causing the output device 544 to output an indication of the status (such as the same indication that was received). In such an embodiment, while the output device 544 may technically store an indication of the status in some form or state to allow outputting of an indication of the status, it should be understood that such status information (e.g., the status data 554) is not, in such embodiments, stored in a memory of the portable wagering medium 530 (e.g., at least because the portable wagering medium 530, in such embodiments, does not comprise a distinct memory 550 device or component).

In some embodiments, the portable wagering medium 530 may be implemented by inclusion of various features, structures, and/or configurations that may be advantageous to implementation of some embodiments.

Turning to FIG. 6A, FIG. 6B, FIG. 6C, and FIG. 6D, for example, perspectives diagrams of portable wagering mediums 630a-d according to some embodiments are shown. In some embodiments, the portable wagering mediums 630a-d may be similar in configuration and/or functionality to any of the portable wagering mediums 130, 230, 330, 530 of FIG. 1, FIG. 2, FIG. 3, and/or FIG. 5 herein. The portable wagering mediums 630a-d may comprise, for example, casings 632a-d, a translucent portion 634, input devices 642, and/or an output devices 644a-d (which may include a first output device 644a-1 and/or a second output device 644a-2). In some embodiments, the output devices 644a-d may output one or more status indications 680a-d (which may include a first status indication 680a-1, 680b-1 and/or a second status indication 680a-2, 680b-2). According to some embodiments, the components 632, 642, 644 of the portable wagering mediums 630a-d may be similar in configuration and/or functionality to the similarly named and/or numbered components described in reference to any of FIG. 1, FIG. 2, FIG. 3, FIG. 4, and/or FIG. 5 herein. The perspective illustrations of the portable wagering mediums 630a-d of FIG. 6A, FIG. 6B, FIG. 6C, and FIG. 6D are provided for exemplary purposes only and are not intended to limit the scope of any embodiments described herein.

Figure 6A:
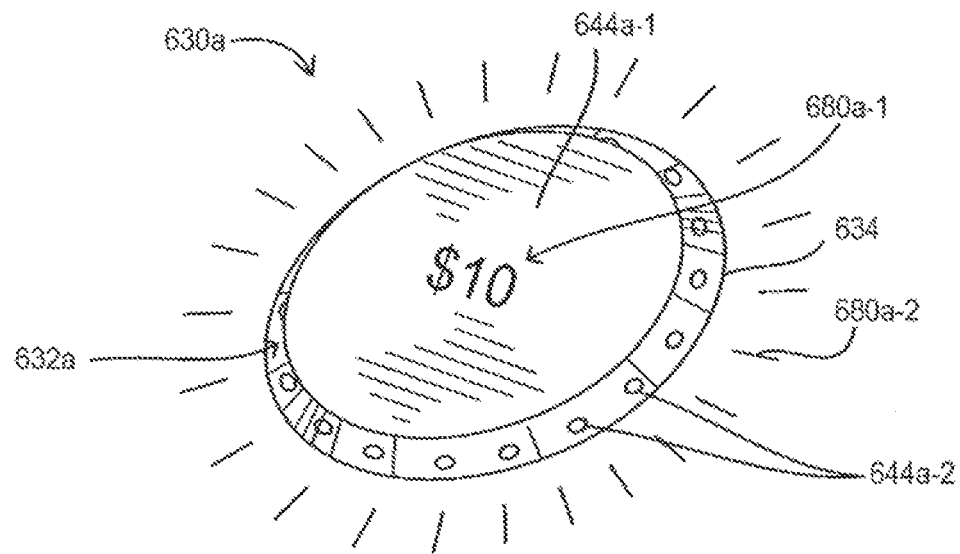
FIG. 6A, FIG. 6B, FIG. 6C, and FIG. 6D are perspective diagrams of portable wagering mediums according to some embodiments.

In FIG. 6A, the first portable wagering medium 630a is depicted as a wagering chip with a circular casing 632a having a tapered edge, a translucent portion 634, a first output device 644a-1 that outputs a first status indication 680a-1 (e.g., "$10"), and a second output device 644a-2 that outputs a second status indication 680a-2 (e.g., an illumination and/or 'glow'). As shown in FIG. 6A, in some embodiments substantially an entire face of the first portable wagering medium 630a may comprise the first output device 644a-1 to define a display surface and/or screen. In other words, the first output device 644a-1 may be configured in size, shape, and/or orientation to cover and/or comprise any portion of the face of the first portable wagering medium 630a, such as the entire face as shown in FIG. 6A. In such a manner, for example, the amount of information (e.g., status information) that may be presented and/or represented by the first output device 644a-1 may be enhanced and/or increased.

According to some embodiments, the first portable wagering medium 630a may also or alternatively comprise one or more translucent portions 634 via which the second output device 644a-2 may provide the second status indication 680a-2. As shown in FIG. 6A, the second output device 644a-2 may comprise one or more illumination devices such as one or more LED devices coupled to output light indications through the translucent portion 634. While the translucent portion 634 depicted in FIG. 6A comprises an annular device operable to be coupled to an edge of the casing 632a, many other configurations of the translucent portion 634 may also or alternatively be implemented. The translucent portion 634 may comprise, for example, a window, ring, and/or multiple spots, cutouts, and/or other features integrated into the first portable wagering medium 630a and/or the casing 632a thereof. In such a manner, for example, the first portable wagering medium 630a may provide a 'glowing' and/or or other illumination-related output via which the second status indication 680a-2 may be provided (e.g., to a player and/or dealer). A wagering chip 630a having a translucent portion 634 that is illuminated in the color green, for example, may indicate that the wagering chip 630a has been utilized to place a successful wager in a wagering game (e.g., and therefore maintains ownership with the player that placed the bet).

In some embodiments, the translucent portion 634 may be composed of any material that is operable to permit some transmission of light (e.g., in the visible and/or near visible spectrums). The translucent portion 634 may be comprised of, for example, a translucent plastic or synthetic polymer material such as PolyMethyl MethAcrylate (PMMA) or Plexiglass® (e.g., acrylic glass) and/or natural materials such as mica or amber. In some embodiments, the translucent portion 634 may comprise a transparent portion of the first portable wagering medium 630a and/or may be substituted with a transparent portion and/or material, as is or becomes desirable or practicable.

Figure 6B:
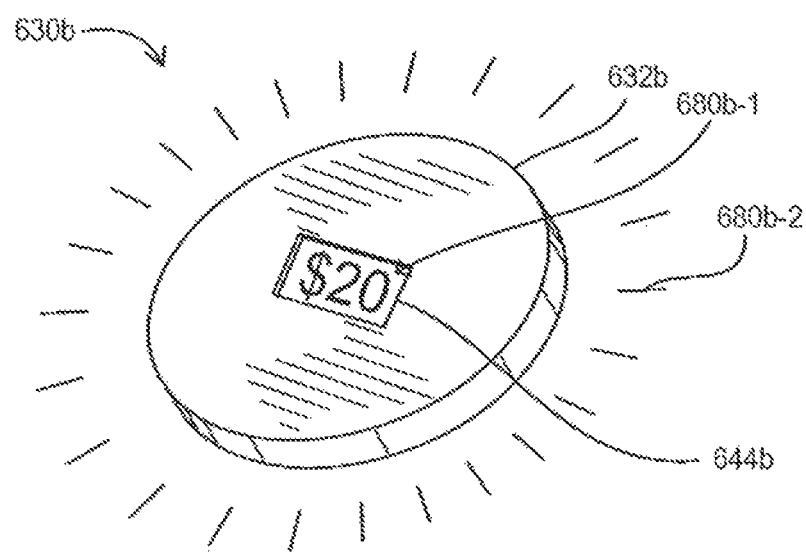

In FIG. 6B, the second portable wagering medium 630b is depicted as a wagering chip having a cylindrical casing 632b and an output device 644b that is operable to output a first status indication 680b-1 (e.g., "$20"). The output device 644b, according to some embodiments, may comprise a display device embedded into and/or otherwise physically coupled to the casing 632b. The output device 644b may also or alternatively, of course, comprise any other form of output device, such as a speaker, coupled to the casing 632b. In some embodiments, the output device 644b may also or alternatively be situated on the obverse or other face of the second portable wagering medium 630b. Some portable wagering mediums 630b, for example, may comprise an output device 644b situated on each face of a wagering chip, such that whether the chip is placed face-up or face-down, the first status information 680b-1 may remain visible.

As shown in FIG. 6B, the casing 632 may, in some embodiments, be constructed of one or more translucent and/or transparent materials. The casing 632 may be constructed of a translucent and/or transparent acrylic compound, for example, that is operable to transmit the second status indication 680b-2. A second output device (not explicitly shown in FIG. 6B) may be embedded and/or housed within the translucent casing 632, for example, and may provide the second status indication 680b-2 via the casing 632. In such a manner, for example, the entire second portable wagering medium 630b (and/or a substantial portion thereof) may be illuminated and/or may 'glow' to indicate a status of the second portable wagering medium 630b (e.g., as described herein).

Figure 6C:
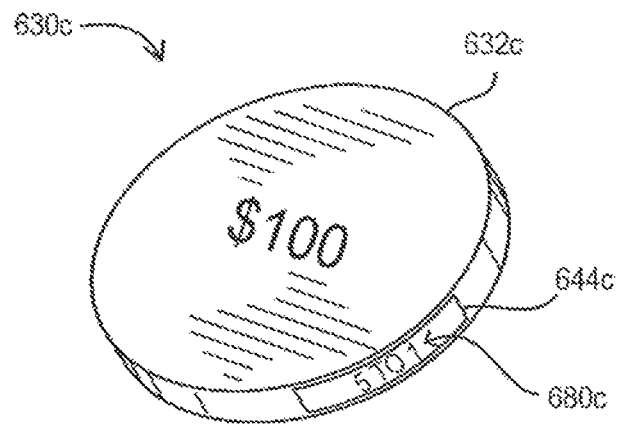

In FIG. 6C, the third portable wagering medium 630c is depicted as a wagering chip having a cylindrical casing 632c and an output device 644c coupled to the edge of the third portable wagering medium 630c, the output device 644c being operable to output a status indication 680c (e.g., "5 to 1"). The output device 644b, according to some embodiments, may comprise a display device embedded into and/or otherwise physically coupled to the edge of the casing 632b. In some embodiments, the entire edge of the third portable wagering medium 630c (and/or a substantial portion thereof) may be comprised of the output device 644c. The output device 644c may, for example, display information along the edge of the third portable wagering medium 630c such that the output (e.g., the status indication 680c) may remain visible even in the case that the third portable wagering medium 630c is situated in a stack of wagering chips and/or is placed in a chip tray (e.g., the chip tray 218 of FIG. 2).

Figure 6D:
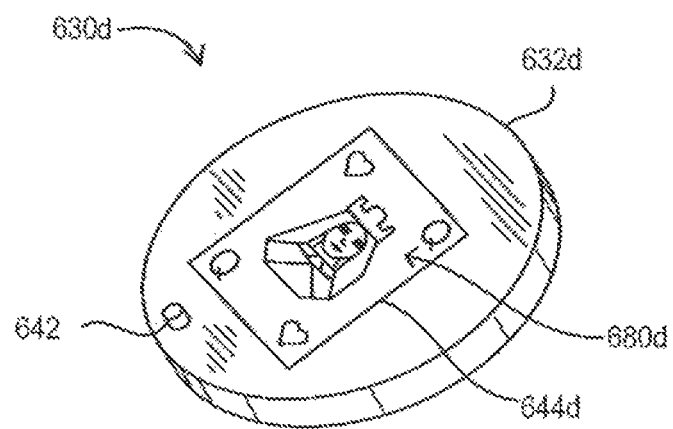

In FIG. 6D, the fourth portable wagering medium 630d is depicted as a wagering chip having a cylindrical casing 632d, an input device 642, and an output device 644d operable to output a status indication 680d (e.g., a rendition of a playing card). The input device 642 may, as shown in accordance with some embodiments, comprise a button and/or other tactile input device. In some embodiments, other types of input devices 642 may be implemented. While not explicitly shown in FIG. 6A, for example, the translucent portion 634 may be depressible and/or otherwise operable to be actuated (e.g., by squeezing, rotating, and/or tapping) to provide input. Similarly, one or more inertial and/or other internal features of the fourth portable wagering medium 630d may be provided and may be operable to receive input, without requiring any special external features and/or protrusions from the casing 632d. The input device 642 may be utilized by a player to indicate, for example, that the player desires to enter into a secondary game operable to be played (at least in part) utilizing the fourth portable wagering medium 630d. The input device 642 may also or alternatively be operable to provide other indications such as a request to "hold" the displayed playing card (e.g., the status indication 680d) and/or to otherwise provide information associated with play of one or more secondary games.

As shown in FIG. 6D, for example, the status information 680d comprises a rendition of a playing card which may be utilized, for example, in a secondary game (e.g., a game other than a primary game in which the fourth portable wagering medium 630d is utilized to place a wager). A player may acquire various portable wagering mediums 630d, for example, each displaying a rendition of a playing card. The player may then, for example, utilize the displayed playing cards to attempt to form a poker hand and/or to otherwise participate in a secondary game.

IV. Data Storage Structures

A. Player Database

Figure 7:
FIG. 7 is a block diagram of a data storage structure according to some embodiments.

Referring now to FIG. 7, a block diagram of a data storage structure 752 according to some embodiments is shown. In some embodiments, the data storage structure 752 may be similar in configuration and/or content to the player data 452 described in conjunction with FIG. 4 herein and/or may be stored in a structure and/or device similar to the databases 150, 250 and/or the memory 450, 550 of FIG. 1, FIG. 2, FIG. 4, and/or FIG. 5 herein. Any or all of the data storage structure 752 may, for example, be stored in and/or otherwise associated with or accessible to a wagering game device 110, 210, 310, 410 and/or a portable wagering medium 130, 230, 330, 530, 630a-d, as described herein. According to some embodiments, the data storage structure 752 may store player-related information (e.g., information relating to a player 170, 270 of FIG. 1 and/or FIG. 2). In some embodiments, fewer or more data fields than are shown may be associated with the data storage structure 752. Only a portion of one or more databases and/or other data stores is necessarily shown in FIG. 7, for example, and other database fields, columns, structures, orientations, quantities, and/or configurations may be utilized without deviating from the scope of some embodiments. Similarly, the data shown in the various data fields is provided solely for exemplary and illustrative purposes and does not limit the scope of embodiments described herein.

According to some embodiments, such as shown in FIG. 7 for example, the data storage structure 752 may comprise various data fields such as a "player_id" field 752-1, a "player_type" field 752-2, and/or a "chip_id" field 752-3. The "player_id" field 752-1 may, for example, simply store an identifier for each player registered with and/or otherwise associated with a casino or other gambling establishment. Each player that places a wager in a wagering game and/or any player that registers for a player tracking or comp card may, for example, be represented by a unique identifier such as an alphanumeric code stored in the "player_id" field 752-1. Players may also or alternatively be identified and/or described by player types stored in the "player_type" field 752-2. As shown in FIG. 7, for example, various player types such as "presidential", "regular", and "local" may correspond to various characteristics of the associated players.

The "chip_id" field 752-3 may generally store an identifier for one or more portable wagering mediums associated with (e.g., owned and/or possessed by) each respective player. In some embodiments, such as in the case that embodiments herein are practiced utilizing only a portion of portable wagering mediums present in a casino, the "chip_id" field 752-3 may not be populated for some players (e.g., as shown) and/or may only represent a portion of portable wagering mediums associated with any given player. In some embodiments, such as in the case that all portable wagering mediums in a casino are uniquely identifiable, the "chip_id" field 752-3 may store a comprehensive listing of all portable wagering mediums associated with a player.

As described herein, the data storage structure 752 and/or the data stored therein may be utilized to practice some embodiments described herein. In the case that it is desired to update and/or change a status of a certain class or group of portable wagering mediums, for example, the data storage structure 752 may be accessed to identify, for a specific player (e.g., via the "player_id" field 752-1), type of player (e.g., via the "player_type" field 752-2), and/or group of players (e.g., via another field not explicitly shown in FIG. 7), which portable wagering mediums correspond thereto. The portable wagering medium identifiers stored in the chip_id" field 752-3 may then be utilized, for example, to cause various wagering game devices throughout a casino to transmit status information and/or updates to the identified portable wagering mediums.

B. Portable Wagering Medium Database

Referring now to FIG. 8, a block diagram of a data storage structure 854 according to some embodiments is shown. In some embodiments, the data storage structure 854 may be similar in configuration and/or content to the portable wagering medium data 454 described in conjunction with FIG. 4 herein and/or may be stored in a structure and/or device similar to the databases 150, 250 and/or the memory 450, 550 of FIG. 1, FIG. 2, FIG. 4, and/or FIG. 5 herein. Any or all of the data storage structure 854 may, for example, be stored in and/or otherwise associated with or accessible to a wagering game device 110, 210, 310, 410 and/or a portable wagering medium 130, 230, 330, 530, 630*a-d*, as described herein. According to some embodiments, the data storage structure 854 may store portable wagering medium-related information (e.g., information relating to a portable wagering medium 130, 230, 330, 530, 630 of FIG. 1, FIG. 2, FIG. 3, FIG. 5, and/or FIG. 6). In some embodiments, fewer or more data fields than are shown may be associated with the data storage structure 854. Only a portion of one or more databases and/or other data stores is necessarily shown in FIG. 8, for example, and other database fields, columns, structures, orientations, quantities, and/or configurations may be utilized without deviating from the scope of some embodiments. Similarly, the data shown in the various data fields is provided solely for exemplary and illustrative purposes and does not limit the scope of embodiments described herein.

According to some embodiments, such as shown in FIG. 8 for example, the data storage structure 854 may comprise various data fields such as a "chip_id" field 854-1, various "chip_status" fields 854-2, such as a "chip_value" field 854-2*a*, a "chip_location" field 854-2*b*, a "chip_display" field 854-2*c*, and/or a "chip_owner" field 854-2*d*, and/or a "rules" field 854-3.

The "chip_id" field 854-1 may be similar to the "chip_id" field 752-3 of FIG. 7 and/or may store data similar to the identification data 554-1 of FIG. 5. The "chip_id" field 854-1 may, for example, store a unique identifier for each portable wagering medium issued by a casino. The "chip_status" fields 854-2 may, according to some embodiments, store data similar to the status data 554-2 of FIG. 5. The "chip_status" fields 854-2 may, for example, store one or more indications of one or more statuses of a portable wagering medium.

The "chip_value" field 854-2*a* may generally store an indication of a face value of a portable wagering medium. In some embodiments, the "chip_value" field 854-2*a* may store a total value of a portable wagering medium (e.g., a face value plus a bonus) or a bonus or discount value. According to some embodiments, any or all such values may be stored and/or tracked with respect to time by incorporation of a time field (not shown) and/or time or date stamp field in the data storage structure 854. Different values of a wagering chip at different times may be stored and/or tracked, for example, by storing the value for the wagering chip at various times in different records within the "chip_value" field 854-2*a*. Such storing/tracking may reflect external value change events (e.g., the chip changed value several times in an hour, such as due to events that occurred in wagering games) and/or predefined value change events (e.g., the chip will decrease in value by certain increments of value over certain predefined increments of time). Similarly, different values for a wagering chip may be stored and/or tracked in relation to different locations of the wagering chip and/or portable wagering medium by storing chip location information in the "chip_location" field 854-2*b*.

The "chip_location" field 854-2*b* may generally store location information related to portable wagering mediums such as coordinate information (e.g., GPS and/or other coordinates), casino area and/or wagering game device group or bank locations, room names, etc. As shown in FIG. 8, the "chip_location" field 854-2*b* (and/or a separate field not separately shown in FIG. 8) may also or alternatively be utilized to store information regarding which wagering game device the chip is being utilized at and/or how the chip is being utilized (to place a particular type of wager, to purchase a souvenir, etc.).

The "chip_display" field 854-2*c* may generally store an indication of what information is currently being output (and/or has already been output, such as in the case time stamping of data records is performed) by a portable wagering medium. As described herein, such information may simply comprise Boolean data indicative of whether an output device of the portable wagering medium is turned on (e.g., active) or off (e.g., inactive). The information may also or alternatively comprise different and/or more detailed information regarding the output status, as shown by the exemplary data populated in the "chip_display" field 854-2*c* of the data storage structure 854 in FIG. 8. The "chip_display" field 854-2*c* may also or alternatively, for example, store information regarding a particular song and/or sound emitted by the portable wagering device. In some embodiments, the "chip_display" field 854-2*c* may be accessed by the portable wagering device to download song and/or other output data.

The "chip_owner" field 854-2*d* may generally store an indication of which entity owns, possesses, and/or is otherwise associated with a portable wagering medium. In the case that time-stamping is utilized, previous owner information may also or alternatively be stored in the "chip_owner" field 854-2*d*. As shown in FIG. 8, the "chip_owner" field 854-2*d* may generally store any type of indication of the "owning" entity that is or becomes known or practicable, such as unique identifiers, nick names, screen names, alphanumeric codes, etc.

The "rules" field 854-3 may generally store indication of rules associated with portable wagering medium statuses. In the case that a wagering game device detects a portable wagering medium being utilized to place a specific type of wager, for example, the wagering game device may access the "rules" field 854-3 of the data storage structure 854 to determine that that specific portable wagering medium is restricted from placing that specific type of wager. The wagering game device may accordingly send a signal to the portable wagering medium causing the portable wagering medium to output an indication of the "illegal" bet (e.g., the portable wagering medium may display the word "ILLEGAL", glow or blink in a particular color, and/or emit a beeping 'error' sound). In some embodiments, the "rules" field 854-3 may also store the particular indication that is desired to be output by the portable wagering medium upon occurrence of an event and/or in certain situations (e.g., the "rules" field 854-3 may store an indication that the word "ILLEGAL" should be output in the case the portable wagering medium is attempted to be utilized to place improper bets).

V. Processes

Various embodiments will now be described with references to methods, procedures, and/or processes associated with some embodiments. The methods, procedures, and/or processes described herein may generally be performed by one or more of the systems 100, 200, 300 and/or any of the many components and/or devices described herein. Other configurations of systems and devices may also or alternatively be utilized to perform the methods described herein without deviating from the scope of some embodiments. The flow diagrams described herein do not necessarily imply a fixed order to the actions, and embodiments may be performed in any order that is practicable. Note that any of the methods described herein may be performed by hardware, software (including microcode), firmware, or any combination thereof. For example, a storage medium may store thereon instructions that when executed by a machine result in performance according to any of the embodiments described herein.

A. Wagering Game Device Processes

Figure 9:
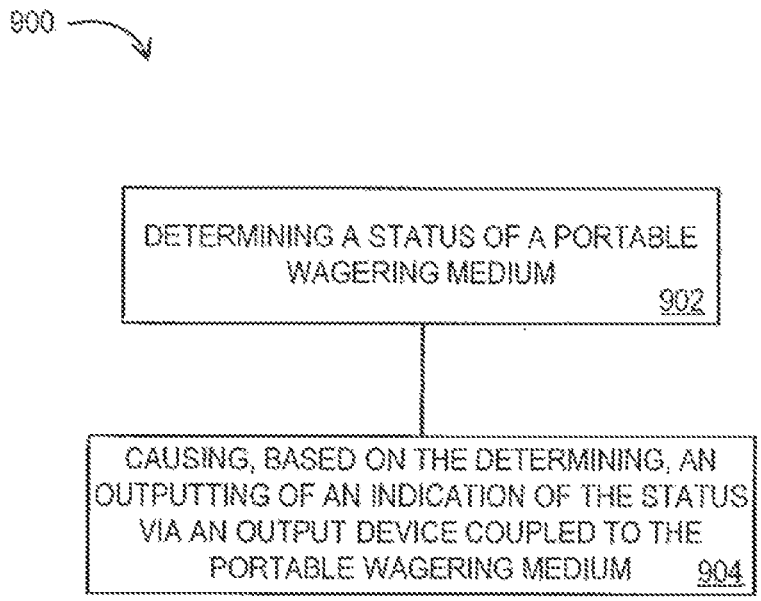
FIG. 9 is a flow diagram of a method according to some embodiments.

Referring now to FIG. 9, a flow diagram of a method 900 according to some embodiments is shown. In some embodiments, the method 900 may be performed and/or implemented by and/or otherwise associated with a wagering game device such as the wagering game devices 110, 210, 310, 410 described in conjunction with FIG. 1, FIG. 2, FIG. 3, and/or FIG. 4 herein. While some of the procedures of a process or method may be performed by a first device, other steps may be performed by another device and/or a combination of devices. Further, the method 900, and all other processes described herein unless expressly specified otherwise, may include procedures in addition to those expressly depicted in the figures or described in the specification without departing from the spirit and scope of some embodiments.

According to some embodiments, the method 900 may comprise determining a status of a portable wagering medium, at 902. A wagering game device (and/or a controller or other device separate from the portable wagering medium) may, for example, query a database (e.g., internal or local and/or remotely) to access a stored indication of a status of the portable wagering medium. In some embodiments, the wagering game device may first determine an identity of the portable wagering medium, such as by reading an RFID, barcode, and/or other indicia of an identifier from the portable wagering medium (and/or by otherwise receiving such information). The identifier may then be utilized, for example, to access one or more records in a database that store information associated with the portable wagering medium. According to some embodiments, such as in the case that the database and/or other data store accessed by the wagering game device resides within the portable wagering medium, the wagering game device may receive an indication of the status from the portable wagering medium itself. In some embodiments, the wagering game device may determine the status via communications with a server or controller. The controller may, for example, access a database and/or otherwise determine the status and provide an indication of the status to the wagering game device. In such a manner, for example, the wagering game device may not require access and/or direct access to any particular data store to determine the status.

In some embodiments, such as in the case that the status is based on one or more rules, the wagering game device may determine the status by looking up the one or more rules in an accessible data store. Such rules may be stored remotely such as a central controller of a casino network, for example, and/or may be stored locally on or by the wagering game device. The wagering game device may then, after determining the one or more rules and/or other criteria, for example, determine and/or define the status based on data relating to the one or more rules. In the case that a rule specifies that the status of the portable wagering medium, such as the applicable face value of the portable wagering medium, varies based on a type of wager that the portable wagering medium is utilized to make, for example, the wagering game device may determine the type of wager and process the appropriate resulting status. In some embodiments, the rule may be stored by the portable wagering medium itself, and the wagering game device may therefore determine the rule by interfacing with the portable wagering medium, and then determining the status based on the rule. Such an embodiment would not necessitate, for example, the wagering game device being provided with an identifier of the portable wagering medium.

In some embodiments, the status and/or type of status may be based on one or more various types of data. The status may be based on, for example: (i) an event in a wagering game in which the portable wagering medium is utilized to place a wager, (ii) a time associated with the portable wagering medium, (iii) a usage limitation of the portable wagering medium, (iv) a proximity of the portable wagering medium to another portable wagering medium, (v) a wagering history of the portable wagering medium, (vi) a current location of the portable wagering medium, and/or (vii) an entity associated with the portable wagering medium. According to some embodiments, method 900 may include one or more additional processes and/or sub-procedures dependent upon which type(s) of data the status may be based.

In the case that the status is based on an event in a wagering game in which the portable wagering medium is utilized to place a wager, for example, the event may be determined. This may comprise, for example, a wagering game device determining an outcome (or potential outcome) for a wagering game. Upon placement of a wager utilizing the portable wagering medium, for example, the status may comprise the fact that the portable wagering medium has been utilized to place a wager (or that it has not been utilized, in the case that the wager is placed with a different portable wagering medium), a value of a potential payout and/or payout rate for the placed wager, odds and/or probabilities of obtaining a winning outcome for the placed wager, a type of wager or bet placed, that the wager placed with the portable wagering medium was placed late, that the wager is ambiguous (e.g., the portable wagering medium is placed on a line between betting areas), that the wager is illegal (e.g., the portable wagering medium is associated with an improper wager amount—such as a wager that fails to meet a table minimum or exceeds a maximum bet for the wagering game), that the wager is placed with respect to a current round of betting (e.g., as opposed to a previous round of betting), that the wager is a potential dealer tip bet, that the portable wagering medium is utilized to change a wager (e.g., the portable wagering medium is moved to change a wager type and/or size), how the portable wagering medium has been utilized to change the wager (e.g., a previous and/or original wager amount), and/or that the portable wagering medium is part of either a main 'pot' or a side bet. Upon resolution of the game outcome for the placed wager the status may comprise, in some embodiments, the fact that the portable wagering medium was utilized to place a winning wager, losing wager, tie ("push") wager, and/or specific type of wager or win/loss/tie, that a losing portable wagering medium should be or has been collected by the dealer and/or wagering game device (e.g., as part of a dealer 'rake', and/or that the portable wagering medium has been or still needs to be paid off (e.g., by the dealer at a table wagering game).

In the case that the status is based on a time associated with the portable wagering medium, for example, one or more of a previous time, current time, future time, and/or one or more durations of time may be determined, measured, and/or calculated. In some embodiments for example, a duration of time that a portable wagering medium has been owned, possessed, and/or associated with a particular entity (e.g., the player 170, 270 of FIG. 1 and/or FIG. 2) may be determined, a duration of time since the portable wagering medium was last owned, possessed, and/or associated with a particular entity (e.g., a celebrity) may be determined, an amount of time since the portable wagering medium was purchased, won, utilized to place a wager (e.g., age of a particular wager and/or age of inactivity of portable wagering medium), and/or utilized to place a winning, losing, or tie wager may be determined, and/or an amount of time until a portable wagering medium expires, changes in value or usage restriction, and/or a specific time or date upon which the portable wagering medium expires or otherwise changes status may be determined. Such time-related information may be determined, for example, by accessing data from the portable wagering medium, a wagering game device, a controller, a clock and/or timer of any of such devices, and/or a peripheral device.

In the case that the status is based on a usage limitation of the portable wagering medium, for example, one or more of (i) a type associated with the portable wagering medium, (ii) a time associated with the portable wagering medium, and/or (iii) a use of the portable wagering medium, may be determined. In the case that the type of the portable wagering medium comprises a "promotional token", for example, the token may only be valid for use in wagering games, and not for redemption or other purchases (e.g., gift shops, shows, and/or meals). The portable wagering medium may also or alternatively only be valid during certain times of the day or week (e.g., during a promotional period or 'slow' period) and/or may only be valid for a certain amount of time after issuance (e.g., seven (7) days). In some embodiments, usage or attempted usage of the portable wagering medium outside of the acceptable predetermined parameters may cause the status to be an "error" or "illegal".

In the case that the status is based on proximity of the portable wagering medium to another portable wagering medium, for example, the locations of and/or contact between the portable wagering mediums may be determined. A current location of each of a plurality of portable wagering mediums may be determined, for example, and, based on these locations, it may further be determined that the portable wagering mediums are (i) in proximity (and/or what range or distance is between the portable wagering mediums), (ii) touching (and/or what the orientation between the portable wagering mediums is), (iii) stacked (and/or how the portable wagering mediums are situated in the stack—such as which portable wagering medium is on top). It may also or alternatively be determined whether an output device of one of the portable wagering mediums (such as a display device) is covered and/or blocked by one or more other portable wagering mediums. This may be advantageous to know, for example, so that one or more of the 'blocking' or 'covering' portable wagering mediums may output an indication associated with the 'covered' or 'blocked' portable wagering medium (e.g., so that the output associated with the 'blocked' or 'covered' portable wagering medium is not "lost").

In the case that the status is based on a wagering history of the portable wagering medium, for example, various metrics, statistics, and/or probabilities associated with the wagering history may be determined and/or tracked/recorded. Such a portable wagering medium history-related status may comprise data descriptive of, for example, (i) when the portable wagering medium was purchased ad/or won (e.g., how many minutes, seconds, hours, and/or game plays ago), (ii) when the portable wagering medium has been utilized to place a wager (e.g., how much time and/or how many game plays have elapsed since the portable wagering medium was utilized to place a wager; such as an age of non-use or an age of a wager), (iii) a previous owner and/or record of another entity that was previously associated with the portable wagering medium, (iv) an amount of time that the portable wagering medium has been owned, possessed, and/or otherwise associated with an entity, (v) a location at which the portable wagering medium was previously utilized (e.g., to place a wager and/or make a purchase), (vi) whether the portable wagering medium was previously utilized to place a changed and/or updated wager (e.g., previous wager information), (vii) when the portable wagering medium was last utilized to place a wager that resulted in a win, loss, and/or tie (e.g., "push")—expressed in an amount of time and/or number of game plays, (viii) a value of previous winnings made while utilizing the portable wagering medium (e.g., an 'earned' amount for the portable wagering medium), and/or (ix) a win/loss record of the portable wagering medium.

In the case that the status is based on a location (e.g., a current location) of the portable wagering medium, for example, the location itself may be determined. Various sensors such as RFID sensors, RF receivers, and/or other devices may be utilized to isolate and/or triangulate a location of the portable wagering medium, for example. In some embodiments, cameras and/or other tracking methods may also or alternatively be utilized. The identified location may comprise any type of location that is or becomes practicable to identify. According to some embodiments, the location may comprise a GPS and/or other coordinate or reference, an identifier of a particular room and/or area of a casino and/or resort property, a particular gaming device at which the portable wagering medium is present and/or utilized at, a specific area and/or placement of the portable wagering medium with respect to a wagering game device (e.g., still in the player's pocket, in a specific chip tray, placed in a specific betting area, placed in a 'pot' or 'pool', collected as part of a 'rake', and/or coordinates associated with a playing surface of the wagering game device). Such location information may further identify and/or define various location-related metrics or data. Based on the location of the portable wagering medium, for example, a type of wager placed utilizing the portable wagering medium, the timing of a placed wager, other portable wagering mediums in proximity to and/or within the same predefined area (e.g., a betting area), and/or other such metrics may be determined.

In the case that the status is based on an entity associated with the portable wagering medium, for example, the identity of the entity may be determined. A wagering game device may determine, for example, which portable wagering mediums at and/or near the wagering game device (and/or being utilized in active wagers at the wagering game device) are owned, possessed, and/or otherwise associated with one or more particular entities and/or groups. Upon receiving and/or otherwise determining a player identifier, such as by reading a player tracking card for example, the wagering game device (and/or controller or peripheral device) may identify a player playing a wagering game. One or more portable wagering medium that the player utilizes to participate in the wagering game may then also be identified, and a correspondence and/ or relationship between the identified player and the identified one or more portable wagering mediums may be recorded. In some embodiments, a relationship between one or more players and one or more portable wagering mediums may be inferred from one or more determined physical relationships and/or locations of the player and the portable wagering medium. According to some embodiments, such "ownership" information may comprise information defining one or more previous owners and/or possessors of a portable wagering medium, a duration of ownership and/or possession by a particular entity, a name, nick name, handle, and/or screen name of a player or other entity associated with the portable wagering medium, and/or information associated with the entity and/or player such as the player's gaming status (e.g., gold member, local, regular, tourist), the player's birth date, and/or a standard bet size and/or type of bet that the player typically makes.

According to some embodiments, the method 900 may comprise causing, based on the determining, an outputting of an indication of the status via an output device coupled to the portable wagering medium, at 904. The wagering game device (and/or a controller) may, for example, transmit a signal to the portable wagering medium that is operable to cause the portable wagering medium to display a message descriptive of the status. In some embodiments, the signal may also or alternatively cause the portable wagering medium to glow, blink, beep, and/or play a song, jingle, or ring tone. According to some embodiments, the method 900 may also comprise causing another device to output an indication of the status. It may be advantageous, for example, to not only cause a portable wagering medium that has been utilized to place a winning bet blink green and/or emit a victor tune, but to also cause a display device of the wagering game device and/or of a player device (e.g., a cell phone) to display an indication of the win (e.g., "Great Job!!! You Won!!!").

B. Portable Wagering Medium Processes

Figure 10:
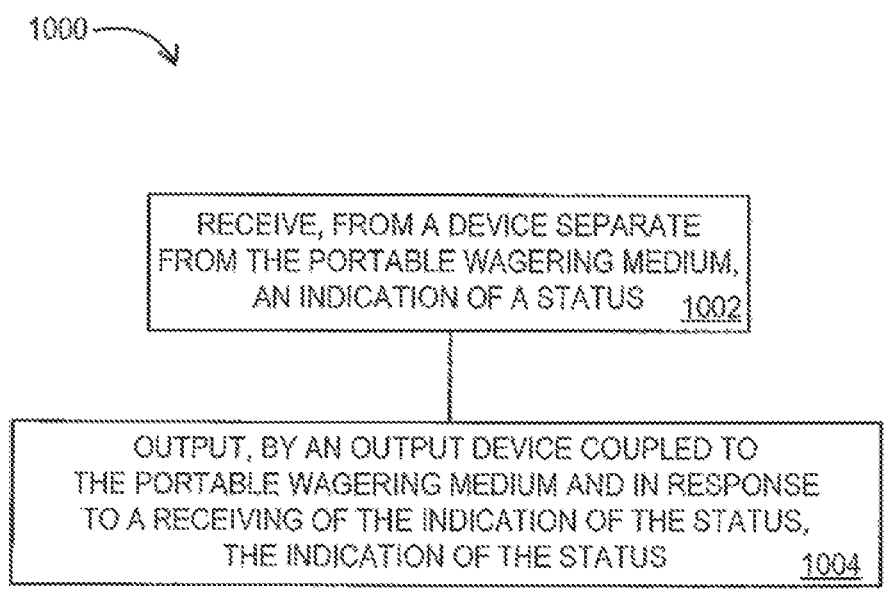
FIG. 10 is a flow diagram of a method according to some embodiments.

Referring now to FIG. 10, a flow diagram of a method 1000 according to some embodiments is shown. In some embodiments, the method 1000 may be performed and/or implemented by and/or otherwise associated with a portable wagering medium such as the portable wagering medium s 130, 230, 330, 530, 630 described in conjunction with FIG. 1, FIG. 2, FIG. 3, FIG. 5, and/or FIG. 6 herein. In some embodiments, the method 1000 may be related to the method 900 of FIG. 9. The method 1000 may, for example, comprise processes that are a continuation of and/or are supplemental to or otherwise associated with those of the method 900 of FIG. 9.

According to some embodiments, the method 1000 may comprise receiving, from a device separate from the portable wagering medium, an indication of a status, at 1002. As described herein, for example, a wagering game device may transmit a signal indicative of a status to the portable wagering medium.

According to some embodiments, the method 1000 may comprise outputting, by an output device coupled to the portable wagering medium and in response to a receiving of the indication of the status, the indication of the status, at 1004. A display device physically and/or communicatively coupled to the portable wagering medium may, for example, be activated to display and indication of the status. In some embodiments, the output indication may be substantially identical to the received indication (e.g., the separate device that provides the indication of the status may simply command the portable wagering medium what to output) or may be a different indication of the status (e.g., the separate device may tell the portable wagering medium what the appropriate current status is, and the portable wagering medium may determine and output a message and/or other data that corresponds to and/or is appropriate for the current status.

According to some embodiments, the type of status indication provided to and/or output by the portable wagering medium may be specific to a particular metric and/or value upon which the status is based. In the case that the status is based on an event and/or result of a wagering game, for example, the portable wagering medium may, such as in the case that the portable wagering medium/wagering chip is utilized to place a wager that is below a minimum acceptable wager (e.g., at a table game), glow or illuminate in a particular color (e.g., blue) to prompt the dealer that the player should "color up" their chips (e.g., trade in multiple lower face value chips for fewer higher face value chips). The portable wagering medium may also or alternatively light up when it is utilized to place a bet, stop lighting up when it is not used to place a bet, blink green if it is placed on a line between two bet options (e.g., a portable wagering medium may blink green if it is halfway between a player's betting circle in blackjack and the players stack of unused chips), display the word "Invalid" on an LCD display when it is used to place a bet on "Come" in craps when the thrower has not yet established a point number for the pass line, display the text "Too Small" on an LCD on the top of the portable wagering medium and/or glow red (e.g., in the case that a player attempts to place a five dollar ($5) bet at a table with a ten dollar ($10) minimum bet restriction), and/or blink red to indicate that it was used to place a late bet. These types of output indications may alert a dealer and/or the player to highlight various game-play related statuses of the portable wagering medium. In some embodiments, such a feature may advantageously help to avoid arguments regarding whether a bet was placed late, by whom a bet was placed, values and/or payouts of bets, and/or whether a bet is a winning, losing, or tie bet.

In some embodiments, the portable wagering medium may also or alternatively blink whenever it is moved to alert the dealer to the change in the bet, utilize an LCD to display the previous location of the portable wagering medium (e.g., "Prev Bet: Red" for a portable wagering medium that used to be bet on red but was then moved to black by a player), and/or blink for the first five (5) seconds after it is used to place a bet and then glow continuously thereafter (indicating that the bet is set and unlikely to change; e.g., an indication of a duration of time since the portable wagering medium was used to place bet).

According to some embodiments, the portable wagering medium may output a specific indication based on a type of wager made utilizing the portable wagering medium. The portable wagering medium may, for example, display "Pays out 2:1" to indicate that it has been utilized to place a bet on column one (1) in a game of roulette (e.g., an indication of a payout rate associated with a bet placed using the portable wagering medium), display the text "Pays $45" to indicate that the portable wagering medium is a five dollar ($5) chip is used to place a bet on "Hard 6" in craps (which pays 9:1; e.g., 9*5=45), light up if it is used to place a double down or split bet in blackjack (e.g., an indication of the type of bet), and/or not light up like other bets or may light up differently from other bets (e.g., to indicate that it is placed as a bet on behalf of a dealer (with a winning result ending up as the dealer's tip)).

In some embodiments, the portable wagering medium may output an indication specific to various events in one or more specific wagering games (and/or types of wagering games). In the case that the portable wagering medium is utilized to play poker, for example, the portable wagering medium may glow brighter than portable wagering mediums that have been added to the pot by other players to indicate that the portable wagering medium is added to the pot by the current player, glow red when placed in the pot (whereas other portable wagering mediums in the pot may glow yellow) to indicate that the portable wagering medium is part of the current round of betting, glow blue to indicate that the current round of betting is part of a rake (e.g., to help a dealer at a poker table to quickly determine which portable wagering mediums should be removed from the pot as part of the rake and avoid confusion on the part of players as to how much money they may receive for winning the pot), and/or indicate which "pot" the portable wagering medium is part of. With respect to the last example in the list, for example, in the case that a first player places a bet than cannot be covered by a second player, a side pot may be created in a game of poker. The light up color of portable wagering mediums in the pot may represent which portable wagering mediums are part of the main pot (e.g., portable wagering mediums that glow green) and which portable wagering mediums are part of the side pot (e.g., portable wagering mediums that glow red).

According to some embodiments, the portable wagering medium may output specific indication based on whether the portable wagering medium is a winner or loser. The portable wagering medium may, for example, blink and play a jingle in the case that it is utilized to place a winning bet, turn its display off in the case that it is utilized to place a losing bet, blink an LED on and off to indicate that the portable wagering medium has been utilized to place a winning bet that has not yet been paid off by a dealer (e.g., to help the dealer to keep track which bets have been paid off and which have not), darken its display to indicate that it no longer requires attention from the dealer (e.g., to indicate that the portable wagering medium represents a winning bet that has already been paid off by a dealer), blink slowly (e.g., once every two (2) seconds) to indicate to the dealer that it needs to be removed from the felt (e.g., the portable wagering medium represents a losing bet that has not yet been picked up by a dealer), display the word "Push" to indicate that the bet was a push outcome in blackjack, and/or pulse bright blue and play a jingle to indicate a win by hitting Blackjack (whereas a portable wagering medium won by a dealer bust glows a dull blue).

In the case that the status is based on a proximity of the portable wagering medium to one or more other portable wagering mediums, for example, the portable wagering medium may glow the same color, blink in unison, and/or blink in a specific sequence in coordination with other portable wagering mediums in the same stack and/or proximity, display, in the case that it is the top wagering chip in a stack, an indication for the stack (the entire stack and/or a portion thereof; e.g., a total value of the stack of wagering chips), deactivate an output device such as a display in the case that the display is obscured by other wagering chips or otherwise not visible to a player or dealer (e.g., to facilitate conservation of power), and/or output a status of another nearby portable wagering medium.

In the case that the status is based on a history and/or record of wins, losses, and/or ties associated with the portable wagering medium, for example, the portable wagering medium may light up and/or glow a certain color to indicate a "hotness" or "coolness" of the portable wagering medium. Achievement of a certain threshold number of wins within a certain amount of time, for example, may cause the portable wagering medium to glow red to indicate that the portable wagering medium is "hot". Similarly, 'achievement' of a certain number of losses within a certain amount of time may cause the portable wagering medium to light a blue LED to indicate that the portable wagering medium is "cold". In some embodiments, if the portable wagering medium was recently used to place a winning bet within a predetermined amount of time, the portable wagering medium may glow red for three (3) minutes, and/or the portable wagering medium may stop glowing in the case that it has not been used to place a second bet within four (4) games after it was used to place the winning bet. In some embodiments, the portable wagering medium may glow blue for one (1) minute after having been utilized to place a losing bet, glow brighter and a LCD counter displayed on the top of the portable wagering medium may increment by one each time a winning outcome is achieved utilizing the portable wagering medium, provide a special indication of a number of bets placed with and/or wins achieved with the portable wagering medium (e.g., portable wagering mediums that have been used to place lots of bets may provide premium outputs (e.g., flashier displays, sounds, etc) to indicate their seniority), and/or display a scrolling message "$275 has been won in the last week using this chip" (e.g., an indication of a total value of one or more winning bets placed using the portable wagering medium).

According to some embodiments, the portable wagering medium may output an indication relating to being a new wagering chip and/or portable wagering medium provided to a player. The portable wagering medium may, for example, glow blue for the first ten (10) minutes after it is purchased by a player (e.g., to indicate that the portable wagering medium was recently purchased by a player—such as within a predetermined amount of time and/or within a predetermined number of games), glow bright red to indicate that it is "hot" for five (5) minutes, glow medium red to indicate that it is "warm", and then after fifteen (15) minutes, stop glowing to indicate that it is "cold" (e.g., to indicate that the portable wagering medium was won by the player and/or how long ago such a win occurred), and/or glow orange and/or display "John" on it in the case that the player has purchased the portable wagering medium for the player's grandfather (i.e., "John"), such as to differentiate the portable wagering medium from portable wagering mediums that the grandfather has won or purchased himself.

In the case that the status is based on an entity associated with the portable wagering medium, for example, the portable wagering medium may glow blue to indicate bets placed by a first player may (whereas bets placed by a second player may glow yellow. This may help to prevent confusion regarding which player placed a bet (e.g., at a roulette table) and/or may be helpful in keeping track of "over-the-shoulder" betting by a second player on a first player's game play. In some embodiments, the portable wagering medium may output an identifier of a player such as a player's name or pseudonym (e.g., "Bubba") and/or output an indication of the player's current status in a casino's complimentary program. Any portable wagering mediums that belong to a player who has gold-level comp status may blink in a rainbow pattern when they are used to place bets, for example, while portable wagering mediums that belong to a player who has silver-level comp status may only glow white and may not blink.

According to some embodiments, the portable wagering medium may blink blue/red if the current date is equivalent to a player's birthday (e.g., to convey special circumstances of a player, such as the player having just turned twenty-one (21)), and/or blink to indicate to the player that the total bet value is different from the player's normal bet size (e.g., if a player usually bets fifty dollars ($50) per hand in blackjack and then places a bet of forty-five ($45) on a hand, then the portable wagering medium(s) in the forty-five ($45) bet may provide the indication). The portable wagering medium may also or alternatively output an 'age' of the portable wagering medium. A portable wagering medium that has been in a player's chip tray for over one (1) hour may display the age of the portable wagering medium (e.g., since the player obtained the portable wagering medium and/or since the portable wagering medium was placed in the chip tray) on an LCD, for example. In some embodiments, the portable wagering medium may stop glowing when the portable wagering medium is collected by the casino (e.g., upon a losing wager and/or upon cashing in). In the case that the status of the portable wagering medium is that the portable wagering medium was owned and/or possessed by a particular celebrity in the past, then the portable wagering medium may display, for example, the identity of such celebrity (and/or the identities of the previous five (5) players who have previously used the portable wagering medium).

VI. Examples and Additional Embodiments

Figure 11:
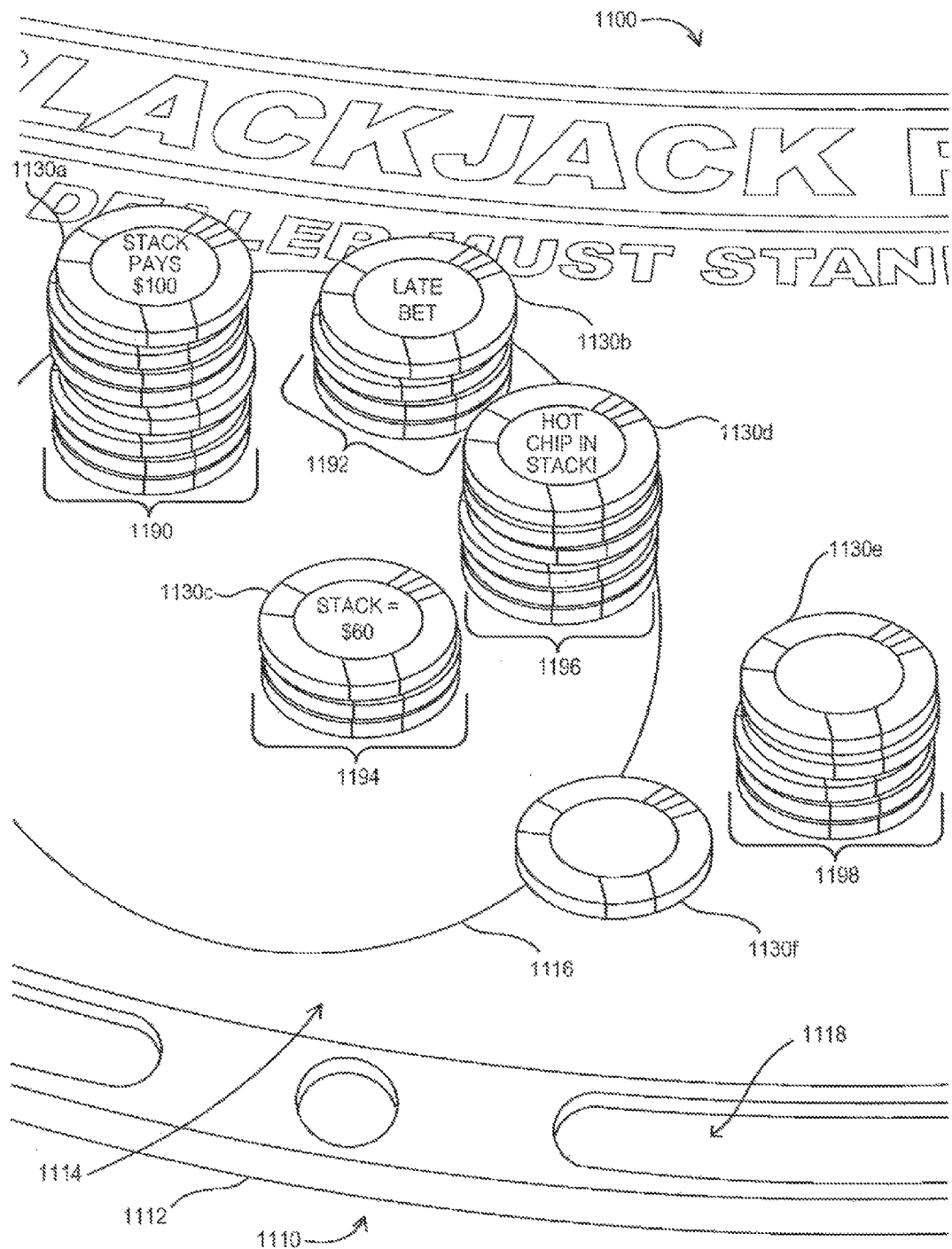
FIG. 11 is a perspective diagram of a system according to some embodiments.

According to some embodiments (as described herein), a status of a portable wagering medium may be based on and/or defined by a proximity, relation, and/or orientation of the portable wagering medium with respect to one or more other portable wagering mediums. Referring to FIG. 11, for example, a perspective diagram of a system 1100 according to some embodiments is shown. In some embodiments, the system 1000 may be similar in configuration and/or functionality to any of the systems 100, 200, 300, 400 of FIG. 1, FIG. 2, FIG. 3, and/or FIG. 4 herein. The system 1100 may comprise, for example, a wagering game device 1110, which itself may comprise a gaming table 1112 having a playing surface 1114 upon which are one or more designated betting areas 1116 and/or one or more chip trays 1118. The system 1100 may also or alternatively comprise one or more portable wagering mediums and/or wagering chips 1130a-f arranged in one or more groups or stacks 1190, 1192, 1194, 1196, 1198.

As shown in FIG. 11, a message may be output by a "top" portable wagering medium 1130a-e of a stack of chips 1190, 1192, 1194, 1196, 1198, the message relating to the entire stack 1190, 1192, 1194, 1196, 1198 and/or a particular chip within the stack 1190, 1192, 1194, 1196, 1198. In the first stack 1190 of FIG. 11, for example, the first stacks' top chip 1130a displays "Stack Pays $100", which indicates that the wager made utilizing the stack of chips 1190 may result in a payback of one hundred dollars ($100) upon occurrence of a winning outcome. Similarly, if the first stack of chips 1190 comprised fifteen dollars ($15) of chips utilized to place a "Hard 6" bet in craps, then the first stack's top chip 1130a may display the text "Pays $225". Similarly, if the first stack of chips 1190 comprised fifteen dollars ($15) of chips utilized to place a "Hard 4" bet (pays out 7:1) in craps, then the first stack's top chip 1130a may display the text "Pays $105". In some embodiments, the wagering game device 1110 (or other computer system) may perform a step of multiplying a value of a bet by a payout rate associated with the bet to determine a potential payout. This potential payout may then be displayed, for example, using a display on a portable wagering medium 1130.

The second stack of chips 1192 is depicted having a second stack top chip 1130b that displays the text "Late Bet". Such an indication may be utilized to point out (e.g., to a dealer) that the second stack of chips 1192 and/or a particular chip therein was utilized to place a late wager in the game. Such a wager may be invalid, for example, and yet may have gone unnoticed by the dealer had the second stack's top chip not output an appropriate message and/or other indication (e.g., beeping).

The third stack of chips 1194 is shown as having a third stack top chip 1130c that displays the text "Stack Value=$60".

The total wagering value (e.g., summed face values) of all chips in the third stack 1194 may be calculated, by the wagering game device 1110 (and/or a computer associated therewith), for example, and the value may then be outputted (or caused to be outputted) by the third stack's top chip 1130c (in the current example, it would appear that the third stack 1194 comprises three (3) twenty dollar ($20) chips).

The fourth stack of chips 1196 is shown as having a fourth stack top chip 1130d that displays the text Hot Chip In Stack!". Statuses of one or more other chips in the same stack 1196 as the top gaming chip. 1130d may be output, for example. The top gaming chip 1130d in a stack 1196 may, in some embodiments, scroll through the win loss histories of all gaming chips in the stack. In such a manner, for example, chips that are "buried" in a stack may not necessarily go unnoticed, particularly if an important status of such a chip is provided by the top chip 1130d.

The fifth stack of chips 1198 comprises a fifth stack top chip 1130e, and the fifth stack of chips 1198 is the only stack of chips shown as being positioned outside of the betting area 1116. While not easily depicted in FIG. 11, in one example, at least because the fifth stack of chips 1198 is in close proximity (e.g., and/or within a predefined radius) of the "hot chip" in the fourth stack of chips 1196, the entire fifth stack of chips 1198 may glow (e.g., red to indicate "warmth" or "hotness") and/or emit a sound or play a recorded voice message (such as "These Chips Have Picked Up Some Warmth from a Nearby Hot Chip!"). The "hotness" of the "hot chip" from the fourth stack of chips 1196 may, for example, "rub off" on nearby, adjacent, and/or touching chips. In such a manner, for example, players may find it entertaining to see "hotness" spread from chip to chip, and this may encourage them to play more. In some embodiments, there may or may not be a benefit with a chip glowing "hot"—this display may simply be for entertainment value only.

While it is also not easily depicted in FIG. 11, as the sixth portable wagering medium 1130f is positioned on the line marking the boundary of the betting area 1116, the sixth portable wagering medium 1130f may provide an audible and/or physical output (e.g., vibrate) to indicate an ambiguous and/or illegal bet. In some embodiments, the sixth portable wagering medium 1130f may not provide any indication (which may itself be an indication that an error in betting has occurred) and/or may only provide an indication upon being queried (e.g., via an input device and/or by the wagering game device 1110) or upon resolution of a gaming outcome (e.g., a reactive output as opposed to a proactive output).

In some embodiments (as described herein), one or more portable wagering mediums 1130 may coordinate their output and/or displays. All chips within a particular stack of chips 1190, 1192, 1194, 1196, 1198 may coordinate to blink and/or illuminate (e.g., all at once and/or coordinated to form a light pattern or display), for example. While no chips 1130 are shown in the chip tray 1118 of FIG. 11, such coordination may occur for various chips 1130 located in the chip tray 1119. The chips 1130 in a player's chip tray 1118 may coordinate their displays to all glow in a single color, for example, and/or if the player has more than one hundred dollars ($100) in chips in the chip tray 1118, the chips 1130 may all glow a bright green. In some embodiments, if the player starts to run low on chips 1130 in the chip tray 1118 (e.g., the player's total chip count is less than one hundred dollars ($100)), then the chips 1130 in the tray 1118 may glow a duller color of green.

VII. Rules of Interpretation

Numerous embodiments are described in this disclosure, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

Neither the Title (set forth at the beginning of the first page of this disclosure) nor the Abstract (set forth at the end of this disclosure) is to be taken as limiting in any way as the scope of the disclosed invention(s).

The term "product" means any machine, manufacture and/or composition of matter as contemplated by 35 U.S.C. §101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

The terms "the invention" and "the present invention" and the like mean "one or more embodiments of the present invention."

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present disclosure, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described herein (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

A player "wagers" at least a single "unit of wager" to pay for a game start. In many gaming devices, a unit of wager may be referred to as a credit. Many gaming devices allow multiple credits to be wagered concurrently in exchange for an improved paytable or more paylines. A unit of wager may be equivalent to a full dollar amount ($1, $5), a fractional dollar amount, a coin (e.g., $0.05 (nickel) or $0.25 (quarter)), or specified amount of another currency (e.g., a specified number of comp points). Some paytables may be expressed as a number of coins won relative to a number of coins wagered. In such instances, the term coin is the same as a unit of wager. Because gaming devices are embodied in different denominations, it is relevant to note that a coin, credit, or unit of wager on a first device may not be identically valued as a coin, credit, or unit of wager on a second device. For example, a credit on a quarter slot machine (on which the credit is equivalent to $0.25) is not the same as a credit on a five dollar slot machine (on which the credit is equivalent to $5.00). Accordingly, it should be understood that in embodiments in which a player may cash out credits from a first gaming device that operates based on a first denomination (e.g., a quarter-play slot machine) and establish, using only the cashed out credits, a credit balance on a second gaming device that operates based on a second denomination (e.g., a nickel-play slot machine), the player may receive a different number of credits on the second gaming device than the number of credits cashed out at the first gaming device. An interesting discussion of this concept can be found in U.S. Pat. No. 5,277,424, which is hereby incorporated by reference in its entirety.

"Determining" something can be performed in a variety of manners and therefore the term "determining" (and like terms) includes calculating, computing, deriving, looking up (e.g., in a table, database or data structure), ascertaining, recognizing, and the like.

A "display" as that term is used herein is an area that conveys information to a viewer. The information may be dynamic, in which case, an LCD, LED, CRT, Digital Light Processing (DLP), rear projection, front projection, or the like may be used to form the display. The aspect ratio of the display may be 4:3, 16:9, or the like. Furthermore, the resolution of the display may be any appropriate resolution such as 480i, 480p, 720p, 1080i, 1080p or the like. The format of information sent to the display may be any appropriate format such as Standard Definition TeleVision (SDTV), Enhanced Definition TV (EDTV), High Definition TV (HDTV), or the like. The information may likewise be static, in which case, painted glass may be used to form the display. Note that static information may be presented on a display capable of displaying dynamic information if desired. Some displays may be interactive and may include touch screen features or associated keypads as is well understood.

The present disclosure frequently refers to a "control system". A control system, as that term is used herein, may be a computer processor coupled with an operating system, device drivers, and appropriate programs (collectively "software") with instructions to provide the functionality described for the control system. The software is stored in an associated memory device (sometimes referred to as a computer readable medium). While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

A "processor" means any one or more microprocessors, Central Processing Unit (CPU) devices, computing devices, microcontrollers, digital signal processors, or like devices. Exemplary processors are the INTEL PENTIUM or AMD ATHLON processors.

The term "computer-readable medium" refers to any medium that participates in providing data (e.g., instructions) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined below and includes many exemplary protocols that are also applicable here.

It will be readily apparent that the various methods and algorithms described herein may be implemented by a control system and/or the instructions of the software may be designed to carry out the processes of the present invention.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models, hierarchical electronic file structures, and/or distributed databases) could be used to store and manipulate the data types described herein. Likewise, object methods or behaviors of a database can be used to implement various processes, such as those described herein. In addition, the databases may, in a known manner, be stored locally or remotely from a device that accesses data in such a database. Furthermore, while unified databases may be contemplated, it is also possible that the databases may be distributed and/or duplicated amongst a variety of devices.

As used herein a "network" is an environment wherein one or more computing devices may communicate with one another. Such devices may communicate directly or indirectly, via a wired, or wireless medium such as the Internet, LAN, WAN or Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, SAS™ by IGT, OASIS™ by Aristocrat Technologies, SDS by Bally Gaming and Systems, ATP, TCP/IP, GDS published by the Gaming Standards Association of Fremont Calif., the best of breed (BOB), system to system (S2S), or the like. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cable TV, satellite links, and the like. Where appropriate encryption or other security measures such as logins and passwords may be provided to protect proprietary or confidential information.

Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE IN C, John Wiley & Sons, Inc. 2d ed., 1996, which is incorporated by reference in its entirety.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

The invention is claimed as follows:

1. A gaming system comprising:
   a first portable wagering medium including at least one first portable wagering medium display device;
   a second portable wagering medium including at least one second portable wagering medium display device;
   at least one processor; and
   at least one memory device which stores a plurality of instructions, which when executed by the at least one processor, cause the at least one processor to operate with the first portable wagering medium and the second portable wagering medium to:
   (a) determine a status of the first portable wagering medium, wherein the status is separate from any wagering value individually associated with the first portable wagering medium and the status is based at least in part on a proximity of the first portable wagering medium to the second portable wagering medium, such that if the first portable wagering medium is in a first proximity to the second portable wagering medium, the status of the first portable wagering medium includes a first status and if the first portable wagering medium is in a second, different proximity to the second portable wagering medium, the status of the first portable wagering medium includes a second, different status, and (b) cause the at least one first portable wagering medium display device to display to a player an indication of the determined status.

2. The gaming system of claim 1, wherein when executed by the at least one processor, the plurality of instructions cause the at least one processor to determine the status of the first portable wagering medium based on a status of the second portable wagering medium.

3. The gaming system of claim 2, wherein when executed by the at least one processor, the plurality of instructions cause the at least one processor to set the status of the first portable wagering medium to be equal to the status of the second portable wagering medium.

4. The gaming system of claim 2, wherein when executed by the at least one processor, the plurality of instructions cause the at least one processor to determine the status of the first portable wagering medium based on the first portable wagering medium being situated on top of the second portable wagering medium.

5. The gaming system of claim 1, wherein when executed by the at least one processor, the plurality of instructions cause the at least one processor to determine the status of the first portable wagering medium based on the first portable wagering medium being part of a stack of portable wagering mediums including the second portable wagering medium.

6. The gaming system of claim 5, wherein the indication of the status of the first portable wagering medium includes an indication of a specific color associated with the stack of portable wagering mediums.

7. The gaming system of claim 5, wherein the indication of the status of the first portable wagering medium includes an indication of a total cumulative value of each of the portable wagering mediums in the stack of portable wagering mediums.

8. The gaming system of claim 5, wherein the stack of portable wagering mediums is utilized to place a wager in a wagering game and the indication of the status of the first portable wagering medium includes an indication of a total cumulative potential payout for the wager.

9. The gaming system of claim 5, wherein the stack of portable wagering mediums is utilized to place a wager in a wagering game and the indication of the status of the first portable wagering medium includes an indication of a total payout which is based on a determined wagering game outcome.

10. The gaming system of claim 5, wherein when executed by the at least one processor, the plurality of instructions cause the at least one processor to determine the status of the first portable wagering medium based on the first portable wagering medium being situated on top of the stack of portable wagering mediums.

11. The gaming system of claim 1, wherein the status of the first portable wagering medium includes the first portable wagering medium being located in a chip tray that includes the second portable wagering medium.

12. A portable wagering medium configured to:

receive, from a device separate from the portable wagering medium, an indication of a status, wherein the status is separate from any wagering value individually associated with the portable wagering medium and the status is based at least in part on a proximity of the portable wagering medium to another portable wagering medium, such that if the portable wagering medium is in a first proximity to the other portable wagering medium, the status includes a first status and if the portable wagering medium is in a second, different proximity to the other portable wagering medium, the status includes a second, different status; and in response to receiving the indication of the status, cause at least one display device attached to the portable wagering medium to display to a player the indication of the status.

13. The portable wagering medium of claim 12, wherein the status is based on a status of the other portable wagering medium.

14. The portable wagering medium of claim 13, wherein the status is based on the portable wagering medium being situated on top of the other portable wagering medium.

15. The portable wagering medium of claim 12, wherein the status is based on the portable wagering medium being part of a stack of portable wagering mediums including the other portable wagering medium.

16. The portable wagering medium of claim 12, wherein the status of the portable wagering medium includes the portable wagering medium being located in a chip tray including the other portable wagering medium.

* * * * *